(12) United States Patent
Sollie et al.

(10) Patent No.: US 10,981,691 B2
(45) Date of Patent: Apr. 20, 2021

(54) TELESCOPING INSULATED BOXES

(71) Applicant: Pratt Retail Specialties, LLC, Conyers, GA (US)

(72) Inventors: Greg Sollie, Sharpsburg, GA (US); Jamie Waltermire, Peachtree City, GA (US); Shifeng Chen, Newport News, VA (US)

(73) Assignee: Pratt Retail Specialties, LLC, Conyers, GA (US)

( * ) Notice: Subject to any disclaimer, the term of this patent is extended or adjusted under 35 U.S.C. 154(b) by 11 days.

(21) Appl. No.: 16/401,607

(22) Filed: May 2, 2019

(65) Prior Publication Data
US 2020/0346816 A1 Nov. 5, 2020

(51) Int. Cl.
| | | |
|---|---|---|
| *B65D 5/32* | (2006.01) | |
| *B31B 50/86* | (2017.01) | |
| *B65D 5/355* | (2006.01) | |
| *B65D 81/38* | (2006.01) | |
| *B31B 50/26* | (2017.01) | |

(Continued)

(52) U.S. Cl.
CPC ............ *B65D 5/0005* (2013.01); *B31B 50/26* (2017.08); *B31B 50/86* (2017.08); *B65D 5/32* (2013.01); *B65D 81/3823* (2013.01); *B65D 81/3858* (2013.01); *B31B 2110/35* (2017.08); *B31B 2120/40* (2017.08)

(58) Field of Classification Search
CPC .... B65D 5/563–556; B65D 5/60; B65D 5/68; B65D 5/667; B65D 5/466; B65D 77/042; B65D 21/0234; B65D 27/005; B65D 27/3853; B65D 81/3858; B65D 81/3897; B65D 81/38; B65D 81/3834; B65D 81/3848; B65D 81/386; B65D 81/3823
USPC .... 229/103.11, 120.01, 120.37, 120.38, 901, 229/117.27, 117.28, 122.32, 5.81–5.84; 206/505–507, 515, 518
See application file for complete search history.

(56) References Cited

U.S. PATENT DOCUMENTS

| | | |
|---|---|---|
| 265,985 A | 10/1882 | Seabury |
| 1,527,167 A | 2/1925 | Birdseye |
| 1,677,565 A | 7/1928 | Oppenheim |

(Continued)

FOREIGN PATENT DOCUMENTS

| | | |
|---|---|---|
| CA | 2019104 | 12/1991 |
| CN | 1503962 | 6/2004 |

(Continued)

OTHER PUBLICATIONS

US 10,562,676 B2, 02/2020, Waltermire et al. (withdrawn)

(Continued)

*Primary Examiner* — Nathan J Newhouse
*Assistant Examiner* — Phillip D Schmidt
(74) *Attorney, Agent, or Firm* — Taylor English Duma LLP

(57) ABSTRACT

A telescoping insulated box assembly, comprising: an outer box, the outer box comprising a side wall and a bottom wall, the side wall and the bottom wall of the outer box each defining an insulation cavity; and an inner box, the inner box comprising a side wall and a wall forming a portion of a top side of the box assembly, each wall of the inner box defining an insulation cavity, the inner box sized to fit into the outer box such that the each of the side walls of the inner box faces one of the side walls of the outer box.

18 Claims, 13 Drawing Sheets

(51) Int. Cl.
  *B31B 120/40* (2017.01)
  *B31B 110/35* (2017.01)

(56) References Cited

U.S. PATENT DOCUMENTS

| | | | |
|---|---|---|---|
| 1,682,410 A | 8/1928 | Oppenheim | |
| 1,747,980 A | 2/1930 | Kondolf | |
| 1,753,813 A | 4/1930 | Washburn | |
| 1,868,996 A | 7/1932 | Sharp | |
| 1,896,393 A | 2/1933 | Devine | |
| 1,899,892 A | 2/1933 | D'Este et al. | |
| 1,930,680 A * | 10/1933 | Hinton | B65D 81/386 |
| | | | 229/120 |
| 1,935,923 A | 11/1933 | Thoke | |
| 1,937,263 A | 11/1933 | Bubb | |
| 1,942,917 A | 1/1934 | D'Este et al. | |
| 1,954,013 A | 4/1934 | Lilienfield | |
| 2,018,519 A | 10/1935 | Hall | |
| 2,070,747 A | 2/1937 | Ostrom | |
| 2,116,513 A | 5/1938 | Frankenstein | |
| 2,148,454 A | 2/1939 | Gerard | |
| 2,165,327 A | 7/1939 | Zalkind | |
| 2,289,060 A | 7/1942 | Merkle | |
| 2,293,361 A | 8/1942 | Roberts | |
| 2,360,806 A * | 10/1944 | Van Rosen | B65D 5/0281 |
| | | | 229/100 |
| 2,386,905 A | 10/1945 | Meitzen | |
| 2,389,601 A | 11/1945 | De Witt | |
| 2,485,643 A | 10/1949 | Norquist | |
| 2,554,004 A | 5/1951 | Bergstein | |
| 2,632,311 A | 3/1953 | Sullivan | |
| 2,650,016 A | 8/1953 | McMillan | |
| 2,753,102 A | 7/1956 | Paige | |
| 2,867,035 A | 1/1959 | Patterson, Jr. | |
| 2,899,103 A | 8/1959 | Ebert | |
| 2,927,720 A | 3/1960 | Adams | |
| 2,986,324 A | 5/1961 | Anderson, Jr. | |
| 2,987,239 A | 6/1961 | Atwood | |
| 3,029,008 A | 4/1962 | Membrino | |
| 3,031,121 A | 4/1962 | Chase | |
| 3,065,895 A | 11/1962 | Lipschutz | |
| 3,096,879 A | 7/1963 | Schumacher | |
| 3,097,782 A | 7/1963 | Koropatkin et al. | |
| 3,182,913 A | 5/1965 | Brian | |
| 3,193,176 A | 7/1965 | Gullickson et al. | |
| 3,222,843 A | 12/1965 | Schneider | |
| 3,236,206 A | 2/1966 | Willinger | |
| 3,282,411 A | 11/1966 | Jardine | |
| 3,286,825 A | 11/1966 | Laas | |
| 3,335,941 A | 8/1967 | Gatward | |
| 3,371,462 A | 3/1968 | Nordkvist et al. | |
| 3,375,934 A | 4/1968 | Bates | |
| 3,420,363 A | 1/1969 | Blickensderfer | |
| 3,435,736 A | 4/1969 | Reiche | |
| 3,503,550 A | 3/1970 | Main et al. | |
| 3,551,945 A | 1/1971 | Eyberg et al. | |
| 3,670,948 A | 6/1972 | Berg | |
| 3,703,383 A | 11/1972 | Kuchenbecker | |
| 3,734,336 A | 5/1973 | Rankow et al. | |
| 3,747,743 A | 7/1973 | Hoffman, Jr. | |
| 3,749,299 A | 7/1973 | Ingle | |
| 3,836,044 A | 9/1974 | Tilp et al. | |
| 3,843,038 A | 10/1974 | Sax | |
| 3,880,341 A | 4/1975 | Bamburg et al. | |
| 3,887,743 A | 6/1975 | Lane | |
| 3,890,762 A | 6/1975 | Ernst et al. | |
| 3,980,005 A | 9/1976 | Buonaiuto | |
| 4,030,227 A | 6/1977 | Oftedahl | |
| 4,050,264 A | 9/1977 | Tanaka | |
| 4,068,779 A | 1/1978 | Canfield | |
| 4,091,852 A | 5/1978 | Jordan et al. | |
| 4,169,540 A | 10/1979 | Larsson et al. | |
| 4,211,267 A | 7/1980 | Skovgaard | |
| 4,213,310 A | 7/1980 | Buss | |
| 4,335,844 A | 6/1982 | Egli | |
| 4,342,416 A | 8/1982 | Philips | |
| 4,380,314 A | 4/1983 | Langston, Jr. et al. | |
| 4,396,144 A | 8/1983 | Gutierrez et al. | |
| 4,418,864 A | 12/1983 | Neilsen | |
| 4,488,623 A | 12/1984 | Linnell, II et al. | |
| 4,509,645 A | 4/1985 | Hotta | |
| 4,679,242 A | 7/1987 | Brockhaus | |
| 4,682,708 A | 7/1987 | Pool | |
| 4,797,010 A | 1/1989 | Coelho | |
| 4,819,793 A | 4/1989 | Willard et al. | |
| 4,828,133 A | 5/1989 | Hougendobler | |
| 4,830,282 A | 5/1989 | Knight, Jr. | |
| 4,889,252 A | 12/1989 | Rockom et al. | |
| 4,930,903 A | 6/1990 | Mahoney | |
| 4,989,780 A | 2/1991 | Foote et al. | |
| 5,016,813 A | 5/1991 | Simons | |
| 5,020,481 A | 6/1991 | Nelson | |
| 5,062,527 A | 11/1991 | Westerman | |
| 5,094,547 A | 3/1992 | Graham | |
| 5,102,004 A | 4/1992 | Hollander et al. | |
| 5,154,309 A | 10/1992 | Wischusen, III et al. | |
| 5,158,371 A | 10/1992 | Moravek | |
| 5,165,583 A | 11/1992 | Kouwenberg | |
| 5,185,904 A * | 2/1993 | Rogers | A45F 5/10 |
| | | | 16/407 |
| 5,226,542 A | 7/1993 | Boecker et al. | |
| 5,230,450 A | 7/1993 | Mahvi et al. | |
| 5,263,339 A | 11/1993 | Evans | |
| 5,358,757 A * | 10/1994 | Robinette | B65D 63/1009 |
| | | | 229/123.2 |
| 5,372,429 A | 12/1994 | Beaver, Jr. et al. | |
| 5,417,342 A * | 5/1995 | Hutchison | B65D 5/68 |
| | | | 229/122.32 |
| 5,418,031 A | 5/1995 | English | |
| 5,441,170 A | 8/1995 | Bane, III | |
| 5,454,471 A | 10/1995 | Norvell | |
| 5,491,186 A | 2/1996 | Kean et al. | |
| 5,493,874 A | 2/1996 | Landgrebe | |
| 5,499,473 A | 3/1996 | Ramberg | |
| 5,505,810 A | 4/1996 | Kirby et al. | |
| 5,511,667 A | 4/1996 | Carder | |
| 5,512,345 A | 4/1996 | Tsutsumi et al. | |
| 5,516,580 A | 5/1996 | Frenette et al. | |
| 5,562,228 A | 10/1996 | Ericson | |
| 5,573,119 A | 11/1996 | Luray | |
| 5,596,880 A | 1/1997 | Welker et al. | |
| 5,613,610 A | 3/1997 | Bradford | |
| 5,615,795 A | 4/1997 | Tipps | |
| 5,638,978 A | 6/1997 | Cadiente | |
| 5,775,576 A | 7/1998 | Stone | |
| 5,842,571 A | 12/1998 | Rausch | |
| 5,906,290 A | 5/1999 | Haberkorn | |
| 5,996,366 A | 12/1999 | Renard | |
| 6,003,719 A | 12/1999 | Steward, III | |
| 6,041,958 A | 3/2000 | Tremelo | |
| 6,048,099 A | 4/2000 | Muffett et al. | |
| 6,050,412 A | 4/2000 | Clough et al. | |
| 6,138,902 A | 10/2000 | Welch | |
| 6,164,526 A | 12/2000 | Dalvey | |
| 6,168,040 B1 | 1/2001 | Sautner et al. | |
| 6,220,473 B1 | 4/2001 | Lehman et al. | |
| 6,223,551 B1 | 5/2001 | Mitchell | |
| 6,238,091 B1 | 5/2001 | Mogil | |
| 6,244,458 B1 | 6/2001 | Frysinger et al. | |
| 6,247,328 B1 | 6/2001 | Mogil | |
| 6,295,830 B1 | 10/2001 | Newman | |
| 6,295,860 B1 | 10/2001 | Sakairi et al. | |
| 6,308,850 B1 | 10/2001 | Coom et al. | |
| 6,325,281 B1 | 12/2001 | Grogan | |
| 6,443,309 B1 | 9/2002 | Becker | |
| 6,453,682 B1 | 9/2002 | Jennings et al. | |
| 6,478,268 B1 | 11/2002 | Bidwell et al. | |
| 6,510,705 B2 | 1/2003 | Jackson | |
| 6,582,124 B2 | 6/2003 | Mogil | |
| 6,618,868 B2 | 9/2003 | Minnick | |
| 6,688,133 B1 | 2/2004 | Donefrio | |
| 6,725,783 B2 | 4/2004 | Sekino | |
| 6,726,017 B2 | 4/2004 | Maresh et al. | |
| 6,736,309 B1 | 5/2004 | Westerman et al. | |

(56) References Cited

U.S. PATENT DOCUMENTS

| | | |
|---|---|---|
| 6,771,183 B2 | 8/2004 | Hunter |
| 6,821,019 B2 | 11/2004 | Mogil |
| 6,837,420 B2 | 1/2005 | Westerman et al. |
| 6,868,982 B2 | 3/2005 | Gordon |
| 6,875,486 B2 | 4/2005 | Miller |
| 6,899,229 B2 | 5/2005 | Dennison et al. |
| 6,910,582 B2 | 6/2005 | Lantz |
| 6,913,389 B2 | 7/2005 | Kannankeril et al. |
| 6,971,539 B1 | 12/2005 | Abbe |
| 7,000,962 B2 | 2/2006 | Le |
| 7,019,271 B2 | 3/2006 | Wnek et al. |
| 7,070,841 B2 | 7/2006 | Benim et al. |
| 7,094,192 B2 | 8/2006 | Schoenberger et al. |
| 7,140,773 B2 | 11/2006 | Becker et al. |
| 7,225,632 B2 | 6/2007 | Derifield |
| 7,225,970 B2 | 6/2007 | Philips |
| 7,229,677 B2 | 6/2007 | Miller |
| 7,264,147 B1 * | 9/2007 | Benson .................. B65D 5/566 229/117.09 |
| 7,392,931 B2 | 7/2008 | Issler |
| 7,452,316 B2 | 11/2008 | Cals et al. |
| D582,676 S | 12/2008 | Rothschild |
| 7,597,209 B2 | 10/2009 | Rothschild et al. |
| 7,607,563 B2 | 10/2009 | Hanna et al. |
| 7,677,406 B2 | 3/2010 | Maxson |
| 7,681,405 B2 | 3/2010 | Williams |
| 7,784,301 B2 | 8/2010 | Sasaki et al. |
| 7,807,773 B2 | 10/2010 | Matsuoka et al. |
| 7,841,512 B2 | 11/2010 | Westerman et al. |
| 7,845,508 B2 | 12/2010 | Rothschild et al. |
| 7,870,992 B2 | 1/2011 | Schille et al. |
| 7,909,806 B2 | 3/2011 | Goodman et al. |
| 7,971,720 B2 | 7/2011 | Minkler |
| 8,118,177 B2 | 2/2012 | Drapela et al. |
| 8,209,995 B2 | 7/2012 | Kieling et al. |
| 8,343,024 B1 | 1/2013 | Contanzo, Jr. et al. |
| 8,365,943 B2 | 2/2013 | Bentley |
| 8,465,404 B2 | 6/2013 | Hadley |
| 8,579,183 B2 | 11/2013 | Belfort et al. |
| 8,596,520 B2 * | 12/2013 | Scott .................. B65D 5/24 229/125.19 |
| 8,613,202 B2 | 12/2013 | Williams |
| 8,651,593 B2 | 2/2014 | Bezich et al. |
| 8,763,811 B2 | 7/2014 | Lantz |
| 8,763,886 B2 | 7/2014 | Hall |
| 8,795,470 B2 | 8/2014 | Henderson et al. |
| 8,919,082 B1 | 12/2014 | Cataldo |
| 8,960,528 B2 | 2/2015 | Sadlier |
| 9,272,475 B2 | 3/2016 | Ranade et al. |
| 9,290,313 B2 | 3/2016 | De Lesseux et al. |
| 9,322,136 B2 | 4/2016 | Ostendorf et al. |
| D758,182 S | 6/2016 | Sponselee |
| 9,394,633 B2 | 7/2016 | Shimotsu et al. |
| 9,408,445 B2 | 8/2016 | Mogil et al. |
| 9,429,350 B2 | 8/2016 | Chapman, Jr. |
| 9,499,294 B1 | 11/2016 | Contanzo, Jr. |
| 9,550,618 B1 | 1/2017 | Jobe |
| 9,605,382 B2 | 3/2017 | Virtanen |
| 9,611,067 B2 | 4/2017 | Collison |
| 9,635,916 B2 | 5/2017 | Bezich et al. |
| 9,701,437 B2 | 7/2017 | Bugas et al. |
| 9,738,420 B2 | 8/2017 | Miller |
| 9,738,432 B1 | 8/2017 | Petrucci et al. |
| 9,834,366 B2 | 12/2017 | Giuliani |
| 9,908,680 B2 | 3/2018 | Shi et al. |
| 9,908,684 B2 | 3/2018 | Collison |
| 9,920,517 B2 | 3/2018 | Sollie et al. |
| 9,950,830 B2 | 4/2018 | De Lesseux et al. |
| 9,981,797 B2 | 5/2018 | Aksan et al. |
| 10,046,901 B1 | 8/2018 | Jobe |
| 10,094,126 B2 | 10/2018 | Collison et al. |
| 10,112,756 B2 | 10/2018 | Menzel, Jr. |
| 10,226,909 B2 | 3/2019 | Frem et al. |
| 10,266,332 B2 | 4/2019 | Aksan et al. |
| 10,357,936 B1 | 7/2019 | Vincent et al. |
| 10,442,600 B2 | 10/2019 | Waltermire et al. |
| 10,507,968 B2 | 12/2019 | Sollie et al. |
| 10,551,110 B2 | 2/2020 | Waltermire et al. |
| 10,583,977 B2 | 3/2020 | Collison et al. |
| 10,800,595 B2 | 10/2020 | Waltermire et al. |
| 10,843,840 B2 | 11/2020 | Sollie et al. |
| 10,858,141 B2 | 12/2020 | Sollie et al. |
| 10,882,681 B2 | 1/2021 | Lnaltermire et al. |
| 10,882,682 B2 | 1/2021 | Collison et al. |
| 10,882,683 B2 | 1/2021 | Collison et al. |
| 10,882,684 B2 | 1/2021 | Sollie et al. |
| 2001/0010312 A1 | 8/2001 | Mogil |
| 2002/0020188 A1 | 2/2002 | Sharon et al. |
| 2002/0064318 A1 | 5/2002 | Malone et al. |
| 2002/0162767 A1 | 11/2002 | Ohtsubo |
| 2003/0145561 A1 | 8/2003 | Cals et al. |
| 2004/0004111 A1 | 1/2004 | Cardinale |
| 2004/0031842 A1 | 2/2004 | Westerman et al. |
| 2004/0079794 A1 | 4/2004 | Mayer |
| 2005/0109655 A1 | 5/2005 | Vershum et al. |
| 2005/0117817 A1 | 6/2005 | Mogil et al. |
| 2005/0189404 A1 | 9/2005 | Xiaohai et al. |
| 2005/0214512 A1 | 9/2005 | Fascio |
| 2005/0224501 A1 | 10/2005 | Folkert et al. |
| 2005/0279963 A1 | 12/2005 | Church et al. |
| 2006/0053828 A1 | 3/2006 | Shallman et al. |
| 2006/0078720 A1 | 4/2006 | Toas et al. |
| 2006/0096978 A1 | 5/2006 | Lafferty et al. |
| 2006/0193541 A1 | 8/2006 | Norcom |
| 2007/0000932 A1 | 1/2007 | Cron et al. |
| 2007/0000983 A1 | 1/2007 | Spurrell et al. |
| 2007/0051782 A1 | 3/2007 | Lantz |
| 2007/0193298 A1 | 8/2007 | Derifield |
| 2007/0209307 A1 | 9/2007 | Andersen |
| 2007/0257040 A1 | 11/2007 | Price, Jr. et al. |
| 2008/0095959 A1 | 4/2008 | Warner et al. |
| 2008/0135564 A1 | 6/2008 | Romero |
| 2008/0173703 A1 | 7/2008 | Westerman et al. |
| 2008/0190940 A1 | 8/2008 | Scott |
| 2008/0203090 A1 | 8/2008 | Dickinson |
| 2008/0289302 A1 | 11/2008 | Vulpitta |
| 2008/0296356 A1 | 12/2008 | Hatcher et al. |
| 2008/0308616 A1 | 12/2008 | Phung |
| 2008/0314794 A1 | 12/2008 | Bowman |
| 2009/0034883 A1 | 2/2009 | Giuliani |
| 2009/0114311 A1 | 5/2009 | McDowell |
| 2009/0193765 A1 | 8/2009 | Lantz |
| 2009/0214142 A1 | 8/2009 | Bossel et al. |
| 2009/0283578 A1 | 11/2009 | Miller |
| 2009/0288791 A1 | 11/2009 | Hammer et al. |
| 2010/0001056 A1 | 1/2010 | Chandaria |
| 2010/0006630 A1 | 1/2010 | Humphries et al. |
| 2010/0062921 A1 | 3/2010 | Veiseh |
| 2010/0072105 A1 | 3/2010 | Glaser et al. |
| 2010/0139878 A1 | 6/2010 | Clemente |
| 2010/0151164 A1 | 6/2010 | Grant et al. |
| 2010/0258574 A1 | 10/2010 | Bentley |
| 2010/0270317 A1 | 10/2010 | Kieling et al. |
| 2010/0282827 A1 | 11/2010 | Padovani |
| 2010/0284634 A1 | 11/2010 | Hadley |
| 2010/0314397 A1 | 12/2010 | Williams et al. |
| 2010/0314437 A1 | 12/2010 | Dowd |
| 2011/0042449 A1 | 2/2011 | Copenhaver et al. |
| 2011/0100868 A1 | 5/2011 | Lantz |
| 2011/0114513 A1 | 5/2011 | Miller |
| 2011/0235950 A1 | 9/2011 | Lin |
| 2011/0284556 A1 | 11/2011 | Palmer et al. |
| 2011/0311758 A1 | 12/2011 | Burns et al. |
| 2011/0317944 A1 | 12/2011 | Liu |
| 2012/0031957 A1 | 2/2012 | Whitaker |
| 2012/0074823 A1 * | 3/2012 | Bezich .................. B65D 21/00 312/240 |
| 2012/0145568 A1 | 6/2012 | Collison et al. |
| 2012/0243808 A1 | 9/2012 | De Lesseux et al. |
| 2012/0248101 A1 | 10/2012 | Tumber et al. |
| 2012/0251818 A1 | 10/2012 | Axrup et al. |
| 2012/0279896 A1 | 11/2012 | Lantz |
| 2013/0112694 A1 | 5/2013 | Bentley |
| 2013/0112695 A1 | 5/2013 | Hall |

(56) References Cited

U.S. PATENT DOCUMENTS

| | | |
|---|---|---|
| 2013/0140317 A1 | 6/2013 | Roskoss |
| 2014/0000306 A1 | 1/2014 | Chapman, Jr. |
| 2014/0021208 A1 | 1/2014 | Anti et al. |
| 2014/0093697 A1 | 4/2014 | Perry et al. |
| 2014/0248003 A1 | 9/2014 | Mogil et al. |
| 2014/0319018 A1 | 10/2014 | Collison |
| 2014/0367393 A1 | 12/2014 | Ranade |
| 2015/0110423 A1 | 4/2015 | Fox et al. |
| 2015/0166244 A1 | 6/2015 | Wood et al. |
| 2015/0175338 A1 | 6/2015 | Culp et al. |
| 2015/0238033 A1 | 8/2015 | Zavitsanos |
| 2015/0239639 A1 | 8/2015 | Wenner et al. |
| 2015/0259126 A1 | 9/2015 | McGoff et al. |
| 2015/0284131 A1 | 10/2015 | Genender et al. |
| 2015/0345853 A1 | 12/2015 | Oeyen |
| 2016/0015039 A1 | 1/2016 | Pierce |
| 2016/0052696 A1 | 2/2016 | Cook et al. |
| 2016/0060017 A1 | 3/2016 | De Lesseux et al. |
| 2016/0304267 A1 | 10/2016 | Aksan |
| 2016/0325915 A1 | 11/2016 | Aksan |
| 2017/0015080 A1 | 1/2017 | Collison et al. |
| 2017/0043937 A1 | 2/2017 | Lantz |
| 2017/0198959 A1 | 7/2017 | Morris |
| 2017/0225870 A1 | 8/2017 | Collison |
| 2017/0233134 A9 | 8/2017 | Grajales et al. |
| 2017/0283157 A1 | 10/2017 | Jobe |
| 2017/0305639 A1 | 10/2017 | Kuhn et al. |
| 2017/0320653 A1 | 11/2017 | Mogil et al. |
| 2017/0334622 A1 | 11/2017 | Menzel, Jr. |
| 2017/0341847 A1 | 11/2017 | Chase et al. |
| 2017/0361973 A1 | 12/2017 | Padilla |
| 2017/0369226 A1 | 12/2017 | Chase et al. |
| 2018/0050857 A1 | 2/2018 | Collison |
| 2018/0051460 A1 | 2/2018 | Sollie et al. |
| 2018/0148246 A1 | 5/2018 | Fu et al. |
| 2018/0194534 A1 | 7/2018 | Jobe |
| 2018/0215525 A1 | 8/2018 | Vogel et al. |
| 2018/0229917 A1 | 8/2018 | Jobe |
| 2018/0237207 A1 | 8/2018 | Aksan et al. |
| 2018/0274837 A1 | 9/2018 | Christensen |
| 2018/0290813 A1 | 10/2018 | Waltermire et al. |
| 2018/0290815 A1 | 10/2018 | Waltermire et al. |
| 2018/0299059 A1 | 10/2018 | McGoff et al. |
| 2018/0327171 A1 | 11/2018 | Waltermire et al. |
| 2018/0327172 A1 | 11/2018 | Waltermire et al. |
| 2018/0334308 A1 | 11/2018 | Moore et al. |
| 2018/0335241 A1 | 11/2018 | Li et al. |
| 2019/0032991 A1 | 1/2019 | Waltermire et al. |
| 2019/0047775 A1 | 2/2019 | Waltermire et al. |
| 2019/0185246 A1 | 6/2019 | Sollie et al. |
| 2019/0185247 A1 | 6/2019 | Sollie et al. |
| 2019/0193916 A1 | 6/2019 | Waltermire et al. |
| 2019/0210790 A1 | 7/2019 | Rizzo et al. |
| 2019/0234679 A1 | 8/2019 | Waltermire et al. |
| 2019/0248573 A1 | 8/2019 | Collison et al. |
| 2019/0270572 A1 | 9/2019 | Collison et al. |
| 2019/0270573 A1 | 9/2019 | Collison et al. |
| 2019/0352075 A1 | 11/2019 | Waltermire et al. |
| 2019/0352076 A1 | 11/2019 | Waltermire et al. |
| 2019/0352080 A1 | 11/2019 | Waltermire et al. |
| 2019/0359412 A1 | 11/2019 | Sollie et al. |
| 2019/0359413 A1 | 11/2019 | Sollie et al. |
| 2019/0359414 A1 | 11/2019 | Sollie et al. |
| 2019/0367209 A1 | 12/2019 | Jobe |
| 2019/0376636 A1 | 12/2019 | Fellinger et al. |
| 2019/0382186 A1 | 12/2019 | Sollie et al. |
| 2019/0390892 A1 | 12/2019 | Waltermire et al. |
| 2020/0088458 A1 | 3/2020 | Waltermire et al. |
| 2020/0103159 A1 | 4/2020 | Waltermire et al. |
| 2020/0122896 A1 | 4/2020 | Waltermire et al. |
| 2020/0148409 A1 | 5/2020 | Sollie et al. |
| 2020/0148410 A1 | 5/2020 | Sollie et al. |
| 2020/0148453 A1 | 5/2020 | Sollie et al. |
| 2020/0283188 A1 | 9/2020 | Sollie et al. |
| 2020/0346841 A1 | 11/2020 | Sollie et al. |
| 2021/0039869 A1 | 2/2021 | Waltermire et al. |
| 2021/0039870 A1 | 2/2021 | Sollie et al. |
| 2021/0039871 A1 | 2/2021 | Sollie et al. |

FOREIGN PATENT DOCUMENTS

| | | | | | |
|---|---|---|---|---|---|
| CN | 102264961 | | 11/2011 | | |
| CN | 206494316 | | 9/2017 | | |
| CN | 108001787 | | 5/2018 | | |
| DE | 1897846 | | 7/1964 | | |
| DE | 102011016500 | | 10/2012 | | |
| DE | 202017103230 | | 7/2017 | | |
| DE | 202017003908 | | 10/2017 | | |
| EP | 0133539 | | 2/1985 | | |
| EP | 0537058 | | 4/1993 | | |
| EP | 2990196 | | 3/2016 | | |
| FR | 1241878 | | 9/1960 | | |
| FR | 2705317 | | 11/1994 | | |
| FR | 2820718 | | 5/2002 | | |
| FR | 2821786 | | 9/2002 | | |
| FR | 3016352 | | 7/2015 | | |
| GB | 217683 | A | * | 6/1924 | ............... B65D 5/62 |
| GB | 235673 | | 6/1925 | | |
| GB | 528289 | | 1/1940 | | |
| GB | 713640 | | 8/1954 | | |
| GB | 1204058 | | 9/1970 | | |
| GB | 1305212 | | 1/1973 | | |
| GB | 1372054 | | 10/1974 | | |
| GB | 2400096 | A | * | 10/2004 | ........... B65D 81/386 |
| GB | 2516490 | | 1/2015 | | |
| GB | 2400096 | | 5/2016 | | |
| JP | 01254557 | | 10/1989 | | |
| JP | 2005139582 | | 6/2005 | | |
| JP | 2005247329 | | 9/2005 | | |
| JP | 2012126440 | | 7/2012 | | |
| WO | 8807476 | | 10/1988 | | |
| WO | 9726192 | | 7/1997 | | |
| WO | 9932374 | | 7/1999 | | |
| WO | 2001070592 | | 9/2001 | | |
| WO | 2014147425 | | 9/2014 | | |
| WO | 2016187435 | A2 | | 5/2016 | |
| WO | 2016187435 | A3 | | 11/2016 | |
| WO | 2018089365 | | 5/2018 | | |
| WO | 2018093586 | | 5/2018 | | |
| WO | 2018227047 | | 12/2018 | | |
| WO | 2019125904 | | 6/2019 | | |
| WO | 2019125906 | | 6/2019 | | |
| WO | 2019226199 | | 11/2019 | | |
| WO | 2020101939 | | 5/2020 | | |
| WO | 2020102023 | | 5/2020 | | |
| WO | 2020122921 | | 6/2020 | | |
| WO | 2020222943 | | 11/2020 | | |

OTHER PUBLICATIONS

US 10,899,530 B2, 01/2021, Sollie et al. (withdrawn)
US 10,899,531 B2, 01/2021, Sollie et al. (withdrawn)
Waltermire, Jamie; Corrected Notice of Allowance for U.S. Appl. No. 15/590,345, filed May 9, 2017, dated Feb. 18, 2020, 9 pgs.
Waltermire, Jamie; Supplemental Notice of Allowance for U.S. Appl. No. 15/590,345, filed May 9, 2017, dated Jan. 9, 2020, 8 pgs.
Waltermire, Jamie; Requirement for Restriction/Election for U.S. Appl. No. 16/526,555, filed Jul. 30, 2019, dated Jan. 17, 2020, 7 pgs.
Sollie, Greg; Non-Final Office Action for U.S. Appl. No. 15/845,540, filed Dec. 18, 2017, dated Feb. 19, 2020, 32 pgs.
Sollie, Greg; Applicant-Initiated Interview Summary for U.S. Appl. No. 16/530,052, filed Aug. 2, 2019, dated Feb. 5, 2020, 2 pgs.
Sollie, Greg; Requirement for Restriction/Election for U.S. Appl. No. 16/401,603, filed May 2, 2019, dated Feb. 18, 2020, 6 pgs.
Sollie, Greg; International Search Report and Written Opinion for PCT Application No. PCT/US19/60486, filed Nov. 18, 2019, dated Jan. 13, 2020, 10 pgs.
Sollie, Greg; Invitation to Pay Additional Fees for PCT/US19/59764, filed Nov. 5, 2019, dated Jan. 2, 2020, 2 pgs.
Sollie, Greg; Final Office Action for U.S. Appl. No. 16/408,981, filed May 10, 2019, dated Feb. 24, 2020, 29 pgs.

(56) References Cited

OTHER PUBLICATIONS

Waltermire, Jamie; Corrected Notice of Allowance for U.S. Appl. No. 15/482,186, filed Apr. 7, 2017, dated Jun. 2, 2020, 10 pgs.
Waltermire, Jamie; Applicant-Initiated Interview Summary for U.S. Appl. No. 16/526,511, filed Jul. 30, 2019, dated Jun. 12, 2020, 5 pgs.
Waltermire, Jamie; Final Office Action for U.S. Appl. No. 16/526,511, filed Jul. 30, 2019, dated May 19, 2020, 39 pgs.
Waltermire, Jamie; Non-Final Office Action for U.S. Appl. No. 16/526,511, filed Jul. 30, 2019, dated Jan. 10, 2020, 23 pgs.
Waltermire, Jamie; Applicant-Initiated Interview Summary for U.S. Appl. No. 16/530,045, filed Aug. 2, 2019, dated Jun. 15, 2020, 3 pgs.
Waltermire, Jamie; Non-Final Office Action for U.S. Appl. No. 16/530,045, filed Aug. 2, 2019, dated May 27, 2020, 38 pgs.
Waltermire, Jamie; Non-Final Office Action for U.S. Appl. No. 15/590,349, filed May 9, 2017, dated Jun. 12, 2020, 30 pgs.
Waltermire, Jamie; Final Office Action for U.S. Appl. No. 16/381,678, filed Apr. 11, 2019, dated Jun. 16, 2020, 8 pgs.
Sollie, Greg; Non-Final Office Action for U.S. Appl. No. 16/552,277, filed Aug. 27, 2019, dated Jun. 3, 2020, 68 pgs.
Collison, Alan B.; Applicant Interview Summary for U.S. Appl. No. 16/658,756, filed Oct. 21, 2019, dated May 6, 2020, 3 pgs.
Collison, Alan B.; Applicant Interview Summary for U.S. Appl. No. 16/658,756, filed Oct. 21, 2019, dated Jun. 29, 2020, 3 pgs.
Collison, Alan B.; Final Office Action for U.S. Appl. No. 16/658,756, filed Oct. 21, 2019, dated May 17, 2020, 10 pgs.
Collison, Alan B.; Non-Final Office Action for U.S. Appl. No. 16/658,756, filed Oct. 21, 2019, dated Feb. 4, 2020, 14 pgs.
MP Global Products LLC: European Search Report for serial No. 17868605.1, dated Mar. 16, 2020, 7 pgs.
Collison, Alan B.; Non-Final Office Action for U.S. Appl. No. 16/414,309, filed May 16, 2019, dated Jul. 17, 2020, 77 pgs.
Collison, Alan B.; Requirement for Restriction/Election for U.S. Appl. No. 16/414,309, filed May 16, 2019, dated Jun. 16, 2020, 5 pgs.
Collison, Alan B.; Non-Final Office Action for U.S. Appl. No. 16/414,310, filed May 16, 2019, dated Jul. 8, 2020, 84 pgs.
Sollie, Greg; Advisory Action for U.S. Appl. No. 16/280,595, filed Feb. 20, 2019, dated Jul. 6, 2020, 3 pgs.
Sollie, Greg; Applicant-Initiated Interview Summary for U.S. Appl. No. 16/401,603, filed May 2, 2019, dated May 15, 2020, 3 pgs.
Sollie, Greg; Final Office Action for U.S. Appl. No. 16/401,603, filed May 2, 2019, dated Jun. 30, 2020, 13 pgs.
Sollie, Greg; Notice of Allowance for U.S. Appl. No. 16/382,710, filed Apr. 12, 2019, dated Jun. 3, 2020, 12 pgs.
Sollie, Greg; Final Office Action for U.S. Appl. No. 16/567,192, filed Sep. 11, 2019, dated Jun. 8, 2020, 20 pgs.
Sollie, Greg; International Preliminary Report on Patentability for PCT Application No. PCT/US18/65459, filed Dec. 13, 2018, dated Jul. 2, 2020, 11 pgs.
Sollie, Greg; International Preliminary Report on Patentability for PCT Application No. PCT/US18/65461, filed Dec. 13, 2018, dated Jul. 2, 2020, 12 pgs.
Sollie, Greg; International Search Report and Written Opinion for PCT Application No. PCT/US20/24820, filed Mar. 26, 2020, dated Jul. 2, 2020, 14 pgs.
Sollie, Greg; International Search Report and Written Opinion for PCT Application No. PCT/US19/59764, filed Nov. 5, 2019, dated Jul. 1, 2020, 13 pgs.
Waltermire, Jamie; Non-Final Office Action for U.S. Appl. No. 16/526,511, filed Jul. 30, 2019, dated Dec. 9, 2019, 55 pgs.
Waltermire, Jamie; Non-Final Office Action for U.S. Appl. No. 16/530,045, filed Aug. 2, 2019, dated Dec. 20, 2019, 61 pgs.
Waltermire, Jamie; Supplemental Notice of Allowance for U.S. Appl. No. 15/590,345, filed May 9, 2017, dated Dec. 3, 2019, 14 pgs.
Waltermire, Jamie; Applicant-Initiated Interview Summary for U.S. Appl. No. 15/590,349, filed May 9, 2017, dated Dec. 3, 2019, 3 pgs.
Waltermire, Jamie; Final Office Action for U.S. Appl. No. 15/590,349, filed May 9, 2017, dated Jan. 6, 2020, 26 pgs.

Waltermire, Jamie; Corrected Notice of Allowance for U.S. Appl. No. 15/663,905, filed Jul. 31, 2017, dated Nov. 18, 2019, 6 pgs.
Waltermire, Jamie; Corrected Notice of Allowance for U.S. Appl. No. 15/663,905, filed Jul. 31, 2017, dated Dec. 26, 2019, 7 pgs.
Waltermire, Jamie; Notice of Allowance for U.S. Appl. No. 15/663,905, filed Jul. 31, 2017, dated Nov. 4, 2019, 18 pgs.
Waltermire, Jamie; Final Office Action for U.S. Appl. No. 16/381,678, filed Apr. 11, 2019, dated Dec. 30, 2019, 17 pgs.
Sollie, Greg; Corrected Notice of Allowance for U.S. Appl. No. 15/845,545, filed Dec. 18, 2017, dated Oct. 31, 2019, 12 pgs.
Sollie, Greg; Final Office Action for U.S. Appl. No. 15/845,540, filed Dec. 18, 2017, dated Oct. 30, 2019, 56 pgs.
Collison, Alan B.; Notice of Allowance for U.S. Appl. No. 15/677,738, filed Aug. 15, 2017, dated Oct. 29, 2019, 14 pgs.
Collison, Alan B.; Supplemental Notice of Allowance for U.S. Appl. No. 15/677,738, filed Aug. 15, 2017, dated Dec. 10, 2019, 4 pgs.
Sollie, Greg; Applicant Initiated Interview Summary for U.S. Appl. No. 15/988,550, filed May 24, 2018, dated Dec. 27, 2019, 3 pgs.
Sollie, Greg; Non-Final Office Action for U.S. Appl. No. 16/280,595, filed Feb. 20, 2019, dated Dec. 19, 2019, 23 pgs.
Sollie, Greg; Final Office Action for U.S. Appl. No. 16/530,052, filed Aug. 2, 2019, dated Dec. 27, 2019, 49 pgs.
Sollie, Greg; Non-Final Office Action for U.S. Appl. No. 16/567,192, filed Sep. 11, 2019, dated Dec. 10, 2019, 49 pgs.
Waltermire, Jamie; Non-Final Office Action for U.S. Appl. No. 15/482,186, filed Apr. 7, 2017, dated Aug. 20, 2019, 81 pgs.
Waltermire, Jamie; Supplemental Notice of Allowance for U.S. Appl. No. 15/482,200, filed Apr. 7, 2017, dated Sep. 10, 2019, 8 pgs.
Waltermire, Jamie; Notice of Allowance for U.S. Appl. No. 15/590,345, filed May 9, 2017, dated Oct. 1, 2019, 28 pgs.
Waltermire, Jamie; Non-Final Office Action for U.S. Appl. No. 15/590,349, filed May 9, 2017, dated Sep. 5, 2019, 25 pgs.
Waltermire, Jamie; Final Office Action for U.S. Appl. No. 15/663,905, filed Jul. 31, 2017, dated Aug. 22, 2019, 23 pgs.
Waltermire, Jamie; Non-Final Office Action for U.S. Appl. No. 16/381,678, filed Apr. 11, 2019, dated Sep. 9, 2019, 50 pgs.
Sollie, Greg; Corrected Notice of Allowance for U.S. Appl. No. 15/845,545, filed Dec. 18, 2017, dated Oct. 1, 2019, 7 pgs.
"Green Cell Foam Shipping Coolers", located at <https://www.greencellfoam.com/shipping-coolers>, accessed on Oct. 18, 2019, 4 pgs.
CooLiner ® Insulated Shipping Bags, available at <http://www/chem-tran.com/packaging/supplies/cooliner-insulated-shipping-bags.php>, accessed on Oct. 18, 2019, 4 pgs.
Sollie, Greg; Final Office Action for U.S. Appl. No. 15/988,550, filed May 24, 2018, dated Aug. 14, 2019, 19 pgs.
Sollie, Greg; Non-Final Office Action for U.S. Appl. No. 15/988,550, filed May 24, 2018, dated Oct. 9, 2019, 17 pgs.
Sollie, Greg; Final Office Action for U.S. Appl. No. 16/280,595, filed Feb. 20, 2019, dated Oct. 3, 2019, 19 pgs.
Sollie, Greg; Non-Final Office Action for U.S. Appl. No. 16/530,052, filed Aug. 2, 2019, dated Oct. 2, 2019, 12 pgs.
Sollie, Greg; Non-Final Office Action for U.S. Appl. No. 16/382,710, filed Apr. 12, 2019, dated Oct. 10, 2019, 49 pgs.
Sollie, Greg; Non-Final Office Action for U.S. Appl. No. 16/408,981, filed May 10, 2019, dated Aug. 20, 2019, 50 pgs.
Waltermire, Jamie; Notice of Allowance for U.S. Appl. No. 15/482,186, filed Apr. 7, 2017, dated Mar. 5, 2020, 29 pgs.
Waltermire, Jamie; Non-Final Office Action for U.S. Appl. No. 16/293,716, filed Mar. 6, 2019, dated May 5, 2020, 70 pgs.
Waltermire, Jamie; Requirement for Restriction/Election for U.S. Appl. No. 16/293,716, filed Mar. 6, 2019, dated Feb. 26, 2020, 6 pgs.
Waltermire, Jamie; Non-Final Office Action for U.S. Appl. No. 16/526,555, filed Jul. 30, 2019, dated Apr. 2, 2020, 63 pgs.
Waltermire, Jamie; Advisory Action for U.S. Appl. No. 16/381,678, filed Apr. 11, 2019, dated Feb. 26, 2020, 3 pgs.
Waltermire, Jamie; Non-Final Office Action for U.S. Appl. No. 16/381,678, filed Apr. 11, 2019, dated Apr. 17, 2020, 30 pgs.
Waltermire, Jamie; Non-Final Office Action for U.S. Appl. No. 16/561,203, filed Sep. 5, 2019, dated May 6, 2020, 59 pgs.
Waltermire, Jamie; Requirement for Restriction/Election for U.S. Appl. No. 16/561,203, filed Sep. 5, 2019, dated Feb. 26, 2020, 5 pgs.

(56) References Cited

OTHER PUBLICATIONS

Sollie, Greg; Restriction Requirement for U.S. Appl. No. 16/552,277, filed Aug. 27, 2019, dated Apr. 20, 2020, 7 pgs.
Sollie, Greg; Non-Final Office Action for U.S. Appl. No. 15/988,550, filed May 24, 2018, dated Mar. 11, 2020, 35 pgs.
Sollie, Greg; Applicant-Initiated Interview Summary for U.S. Appl. No. 16/280,595, filed Feb. 20, 2019 dated May 6, 2020, 3 pgs.
Sollie, Greg; Final Office Action for U.S. Appl. No. 16/280,595, filed Feb. 20, 2019, dated Mar. 24, 2020, 20 pgs.
Sollie, Greg; Non-Final Office Action for U.S. Appl. No. 16/530,052, filed Aug. 2, 2019, dated Mar. 3, 2020, 24 pgs.
Sollie, Greg; Non-Final Office Action for U.S. Appl. No. 16/401,603, filed May 2, 2019, dated Mar. 10, 2020, 37 pgs.
Sollie, Greg; Final Office Action for U.S. Appl. No. 16/382,710, filed Apr. 12, 2019, dated Apr. 6, 2020, 33 pgs.
Waltermire, Jamie; Supplemental Notice of Allowance for U.S. Appl. No. 15/482,200, filed Apr. 7, 2017, dated Jul. 26, 2019, 9 pgs.
Waltermire, Jamie; Supplemental Notice of Allowance for U.S. Appl. No. 15/482,200, filed Apr. 7, 2017, dated Aug. 12, 2019, 7 pgs.
Collison, Alan B.; Corrected Notice of Allowance for U.S. Appl. No. 15/677,738, filed Aug. 15, 2017, dated Jul. 15, 2019, 7 pgs.
Sollie, Greg; Requirement for Restriction/Election for U.S. Appl. No. 16/382,710, filed Apr. 12, 2019, dated Jul. 15, 2019, 6 pgs.
Periwrap; Article entitled: "Insulated Solutions", located at <https://www.peri-wrap.com/insulation/>, accessed on Dec. 3, 2018, 9 pgs.
Waltermire, Jamie; Requirement for Restriction/Election for U.S. Appl. No. 15/482,186, filed Apr. 7, 2017, dated Apr. 17, 2019, 7 pgs.
Waltermire, Jamie; Final Office Action for U.S. Appl. No. 15/482,200, filed Apr. 7, 2017, dated Jan. 2, 2019, 23 pgs.
Waltermire, Jamie; Non-Final Office Action for U.S. Appl. No. 15/482,200, filed Apr. 7, 2017, dated Jun. 11, 2018, 36 pgs.
Waltermire, Jamie; Notice of Allowance for U.S. Appl. No. 15/482,200, filed Apr. 7, 2017, dated May 14, 2019, 25 pgs.
Waltermire, Jamie; Final Office Action for U.S. Appl. No. 15/590,345, filed May 9, 2017, dated Mar. 19, 2019, 42 pgs.
Waltermire, Jamie; Non-Final Office Action for U.S. Appl. No. 15/590,345, filed May 9, 2017, dated Aug. 24, 2018, 41 pgs.
Waltermire, Jamie; Final Office Action for U.S. Appl. No. 15/590,349, filed May 9, 2017, dated May 9, 2019, 31 pgs.
Waltermire, Jamie; Non-Final Office Action for U.S. Appl. No. 15/590,349, filed May 9, 2017, dated Nov. 5, 2018, 41 pgs.
Waltermire, Jamie; Requirement for Restriction/Election for U.S. Appl. No. 15/590,349, filed May 9, 2017, dated Aug. 30, 2018, 10 pgs.
Waltermire, Jamie; Non-Final Office Action for U.S. Appl. No. 15/663,905, filed Jul. 31, 2017, dated Jun. 25, 2019, 66 pgs.
Waltermire, Jamie; Requirement for Restriction/Election for U.S. Appl. No. 15/663,905, filed Jul. 31, 2017, dated Mar. 21, 2019, 8 pgs.
Sollie, Greg; Non-Final Office Action for U.S. Appl. No. 15/845,545, filed Dec. 18, 2017, dated Mar. 5, 2019, 41 pgs.
Sollie, Greg; Notice of Allowance for U.S. Appl. No. 15/845,545, filed Dec. 18, 2017, dated Jun. 19, 2019, 20 pgs.
Sollie, Greg; Non-Final Office Action for U.S. Appl. No. 15/845,540, filed Dec. 18, 2017, dated Apr. 2, 2019, 50 pgs.
Collison, Alan B.; Applicant Interview Summary for U.S. Appl. No. 15/677,738, filed Aug. 15, 2017, dated Dec. 5, 2018, 4 pgs.
Collison, Alan B.; Applicant Interview Summary for U.S. Appl. No. 15/677,738, filed Aug. 15, 2017, dated Apr. 22, 2019, 4 pgs.
Collison, Alan B.; Final Office ACtion for U.S. Appl. No. 15/677,738, filed Aug. 15, 2017, dated Feb. 28, 2019, 14 pgs.
Collison, Alan B.; Non-Final Office Action for U.S. Appl. No. 15/677,738, filed Aug. 15, 2017, dated Oct. 23, 2018, 11 pgs.
Collison, Alan B.; Notice of Allowance for U.S. Appl. No. 15/677,738, filed Aug. 15, 2017, dated Jun. 19, 2019, 10 pgs.
Collison, Alan B.; Requirement for Restriction/Election for U.S. Appl. No. 15/677,738, filed Aug. 15, 2017, dated Jul. 3, 2018, 8 pgs.
Collison, Alan B.; Requirement for Restriction/Election for U.S. Appl. No. 15/677,738, filed Aug. 15, 2017, dated Jul. 31, 2018, 8 pgs.
Sollie, Greg; Non-Final Office Action for U.S. Appl. No. 15/988,550, filed May 24, 2018, dated May 29, 2019, 48 pgs.
Sollie, Greg; Non-Final Office Action for U.S. Appl. No. 16/280,595, filed Feb. 20, 2019, dated May 29, 2019, 60 pgs.
Cellulose Material Solutions, LLC; Brochure for Infinity Care Thermal Liner, accessed on Oct. 22, 2018, 2 pgs.
Uline; Article entitled: Corrugated Corner Protectors—4×4", accessed on Oct. 25, 2018, 1 pg.
DHL Express; Brochure for Dry Ice Shipping Guidelines, accessed on Oct. 26, 2018, 12 pgs.
Thomas Scientific; Article entitled: "Thermosafe: Test Tube Shipper/Rack", accessed on Oct. 26, 2018, 2 pgs.
Stinson, Elizabeth; Article entitled: "A Pizza Geek Discovers the World's Smartest Pizza Box", published Jan. 17, 2014, 8 pgs.
Waltermire, Jamie; International Search Report and Written Opinion for PCT Application No. PCT/US18/65464, filed Dec. 13, 2018, dated Mar. 11, 2019, 9 pgs.
Sollie, Greg; International Search Report and Written Opinion for PCT Application No. PCT/US18/65459, filed Dec. 13, 2018, dated May 1, 2019, 15 pgs.
Sollie, Greg; International Search Report and Written Opinion for PCT Application No. PCT/US18/65461, filed Dec. 13, 2018, dated Mar. 21, 2019, 13 pgs.
Sollie, Greg; International Search Report and Written Opinion for PCT/US18/65463, filed Dec. 13, 2018, dated Mar. 25, 2019, 11 pgs.
American Bag Company; Article entitled: "Cool Green Bag, Small", located at <http://hotcoldbags.com/items/Cool%20Green%20Bag,%20Small>, accessed on Mar. 20, 2017, 2 pgs.
Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Duro Bag; Article entitled: "The Load and Fold Bag", accessed on May 24, 2017, copyrighted Apr. 2017, 3 pgs.
Greenblue; "Environmental Technical Briefs of Common Packaging Materials—Fiber-Based Materials", Sustainable Packaging Solution, 2009, 19 pgs.
Images of Novolex bag, including an outer paper bag, a corrugated cardboard insert, and an inner foil-covered bubble-wrap bag, publicly available prior to May 9, 2017, 7 pgs.
MP Global Products, LLC; International Search Report and Written Opinion of the International Searching Authority for PCT/US2017/060403, filed Nov. 7, 2017, dated Feb. 19, 2018, 15 pgs.
MP Global Products; Article entitled: "Thermopod mailer envelopes and Thermokeeper insulated box liners", located at < http://www.mhpn.com/product/thermopod_mailer_envelopes_and_thermokeeper_insulated_box_liners/packaging>, accessed on Aug. 30, 2017, 2 pgs.
Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.
Periwrap; Article entitled: "Insulated Solutions", located at <https://www.peri-wrap.com/insulation/>, accessed on Dec. 3, 2018, 5 pgs.
Salazar Packaging; Article entitle: "Custom Packaging and Design", located at <https://salazarpackaging.com/custom-packaging-and-design/>, accessed on Sep. 28, 2017, 2 pgs.
Singh, et al; Article entitled: "Performance Comparison of Thermal Insulated Packaging Boxes, Bags and Refrigerants for Single-parcel Shipments", published Mar. 13, 2007, 19 pgs.
Tera-Pak; Article entitled: "Insulated Shipping Containers", located at <http://www.tera-pak.com/>, accessed on Mar. 20, 2017, 3 pgs.
Un Packaging; Article entitled: "CooLiner ® Insulated Shipping Bags", available at <http://www.chem-tran.com/packaging/supplies/cooliner-insulated-shipping-bags.php>, accessed on Aug. 30, 2017, 2 pgs.
Weiku.com; Article entitled: "100% Biodegradable Packing materials Green Cell Foam Stock Coolers", located at <http://www.weiku.com/products/18248504/100_Biodegradable_Packing_materials_Green_Cell_Foam_Stock_Coolers.html>, accessed on Sep. 28, 2017, 7 pgs.

(56) References Cited

OTHER PUBLICATIONS

Voluntary Standard for Repulping and Recycling Corrugated Fiberboard Treated to Improve Its Performance in the Presence of Water and Water Vapor. (revises Aug. 16, 2013) Fibre Box Association (FBA), Elk Grove Village, IL, 1-23, Retrieved from http://www.corrugated.org/wp-content/uploads/PDFs/Recycling/Vol_Std_Protocol_2013.pdf, 23 pgs.
Waltermire, Jamie; Corrected Notice of Allowance for U.S. Appl. No. 15/482,186, filed Apr. 7, 2017, dated Sep. 2, 2020, 12 pgs.
Waltermire, Jamie; Notice of Allowance for U.S. Appl. No. 16/526,511, filed Jul. 30, 2019, dated Sep. 14, 2020, 18 pgs.
Waltermire, Jamie; Final Office Action for U.S. Appl. No. 16/293,716, filed Mar. 6, 2019, dated Sep. 10, 2020, 24 pgs.
Waltermire, Jamie; Final Office Action for U.S. Appl. No. 16/381,678, filed Apr. 11, 2019, dated Aug. 20, 2020, 21 pgs.
Waltermire, Jamie; Notice of Allowance for U.S. Appl. No. 16/381,678, filed Apr. 11, 2019, dated Jul. 30, 2020, 15 pgs.
Waltermire, Jamie; Final Office Action for U.S. Appl. No. 16/561,203, filed Sep. 5, 2019, dated Sep. 10, 2020, 25 pgs.
Waltermire, Jamie; Requirement for Restriction/Election for U.S. Appl. No. 16/689,433, filed Nov. 20, 2019, dated Oct. 16, 2020, 6 pgs.
Sollie, Greg; Final Office Action for U.S. Appl. No. 16/552,277, filed Aug. 27, 2019, dated Aug. 7, 2020, 19 pgs.
Sollie, Greg; Notice of Allowance for U.S. Appl. No. 16/552,277, filed Aug. 27, 2019, dated Aug. 31, 2020, 6 pgs.
Sollie, Greg; Final Office Action for U.S. Appl. No. 15/845,540, filed Dec. 18, 2017, dated Sep. 2, 2020, 28 pgs.
Sollie, Greg; Notice of Allowance for U.S. Appl. No. 15/845,540, filed Dec. 18, 2017, dated Sep. 17, 2020, 5 pgs.
Collison, Alan B.; Applicant-Initiated Interview Summary for U.S. Appl. No. 16/414,309, filed May 16, 2019, dated Aug. 21, 2020, 3 pgs.
Collison, Alan B.; Applicant-Initiated Interview Summary for U.S. Appl. No. 16/414,309, filed May 16, 2019, dated Oct. 15, 2020, 3 pgs.
Collison, Alan B.; Final Office Action for U.S. Appl. No. 16/414,309, filed May 16, 2019, dated Oct. 8, 2020, 15 pgs.
Collison, Alan B.; Applicant-Initiated Interview Summary for U.S. Appl. No. 16/414,310, filed May 16, 2019, dated Jul. 30, 2020, 3 pgs.
Collison, Alan; Final Office Action for U.S. Appl. No. 16/414,310, filed May 16, 2019, dated Oct. 13, 2020, 30 pgs.
Sollie, Greg; Final Office Action for U.S. Appl. No. 15/988,550, filed May 24, 2018, dated Aug. 27, 2020, 27 pgs.
Sollie, Greg; Non-Final Office Action for U.S. Appl. No. 16/280,595, filed Feb. 20, 2019, dated Aug. 28, 2020, 26 pgs.
Sollie, Greg; Final Office Action for U.S. Appl. No. 16/530,052, filed Aug. 2, 2019, dated Aug. 28, 2020, 29 pgs.
Sollie, Greg; Notice of Allowance for U.S. Appl. No. 16/401,603, filed May 2, 2019, dated Aug. 31, 2020, 14 pgs.
Sollie, Greg; Corrected Notice of Allowance for U.S. Appl. No. 16/382,710, filed Apr. 12, 2019, dated Sep. 24, 2020, 9 pgs.
Sollie, Greg; Notice of Allowance for U.S. Appl. No. 16/567,192, filed Sep. 11, 2019, dated Aug. 7, 2020, 14 pgs.
Sollie, Greg; Non-Final Office Action for U.S. Appl. No. 16/408,981, filed May 10, 2019, dated Sep. 16, 2020, 40 pgs.
MP Global Products LLC: European Search Report Response for serial No. 17868605.1, filed Oct. 2, 2020, 15 pgs.
Waltermire, Jamie; Corrected Notice of Allowance for U.S. Appl. No. 16/526,511, filed Jul. 30, 2019, dated Oct. 30, 2020, 14 pgs.
Waltermire, Jamie; Corrected Notice of Allowance for U.S. Appl. No. 16/526,511, filed Jul. 30, 2019, dated Nov. 30, 2020, 9 pgs.
Waltermire, Jamie; Final Office Action for U.S. Appl. No. 16/530,045, filed Aug. 2, 2019, dated Nov. 24, 2020, 40 pgs.
Waltermire, Jamie; Non-Final Office Action for U.S. Appl. No. 16/164,933, filed Oct. 19, 2018, dated Nov. 18, 2020, 104 pgs.
Waltermire, Jamie; Corrected Notice of Allowance for U.S. Appl. No. 15/590,349, filed May 9, 2017, dated Nov. 2, 2020, 9 pgs.
Waltermire, Jamie; Notice of Allowance for U.S. Appl. No. 15/590,349, filed May 9, 2017, dated Oct. 20, 2020, 20 pgs.
Waltermire, Jamie; Final Office Action for U.S. Appl. No. 16/293,716, filed Mar. 6, 2019, dated Oct. 29, 2020, 19 pgs.
Waltermire, Jamie; Non-Final Office Action for U.S. Appl. No. 16/526,555, filed Jul. 30, 2019, dated Oct. 27, 2020, 39 pgs.
Waltermire, Jamie; Final Office Action for U.S. Appl. No. 16/381,678, filed Apr. 11, 2019, dated Oct. 19, 2020, 24 pgs.
Waltermire, Jamie; Notice of Allowance for U.S. Appl. No. 16/561,203, filed Sep. 5, 2019, dated Nov. 3, 2020, 14 pgs.
Waltermire, Jamie; Requirement for Restriction/Election for U.S. Appl. No. 16/689,407, filed Nov. 20, 2019, dated Oct. 29, 2020, 6 pgs.
Sollie, Greg; Corrected Notice of Allowance for U.S. Appl. No. 16/552,277, filed Aug. 27, 2019, dated Nov. 5, 2020, 9 pgs.
Collison, Alan B.; Advisory Action for U.S. Appl. No. 16/658,756, filed Oct. 21, 2019, dated Sep. 25, 2020, 4 pgs.
Collison, Alan B.; Notice of Allowance for U.S. Appl. No. 16/658,756, filed Oct. 21, 2019, dated Oct. 23, 2020, 10 pgs.
Collison, Alan B.; Corrected Notice of Allowance for U.S. Appl. No. 16/414,309, filed May 16, 2019, dated Nov. 16, 2020, 10 pgs.
Collison, Alan B.; Corrected Notice of Allowance for U.S. Appl No. 16/414,309, filed May 16, 2019, dated Nov. 27, 2020, 9 pgs.
Collison, Alan B.; Notice of Allowance for U.S. Appl. No. 16/414/309, filed May 16, 2019, dated Oct. 21, 2020, 6 pgs.
Collison, Alan B.; Notice of Allowance for U.S. Appl. No. 16/414,310, filed May 16, 2019, dated Nov. 13, 2020, 15 pgs.
Collison, Alan B.; Supplemental Notice of Allowance for U.S. Appl. No. 16/414,310, filed May 16, 2019, dated Dec. 3, 2020, 8 pgs.
Sollie, Greg; Corrected Notice of Allowance for U.S. Appl. No. 16/401,603, filed May 2, 2019, dated Nov. 24, 2020, 8 pgs.
Sollie, Greg; Corrected Notice of Allowance for U.S. Appl. No. 16/401,603, filed May 2, 2019, dated Nov. 3, 2020, 9 pgs.
Sollie, Greg; Notice of Allowance for U.S. Appl. No. 16/382,710, filed Apr. 12, 2019, dated Oct. 21, 2020, 5 pgs.
Sollie, Greg; Corrected Notice of Allowance for U.S. Appl. No. 16/567,192, filed Sep. 11, 2019, dated Oct. 20, 2020, 8 pgs.
Sollie, Greg; International Preliminary Report on Patentability for PCT/US18/65463, filed Dec. 13, 2018, dated Dec. 3, 2020, 9 pgs.
Waltermire, Jamie; Non-Final Office Action for U.S. Appl. No. 16/689,433, filed Nov. 20, 2019, dated Feb. 23, 2021, 88 pgs.
Sollie, Greg; Notice of Allowance for U.S. Appl. No. 16/408,981, filed May 10, 2019, dated Feb. 23, 2021, 6 pgs.
Waltermire, Jamie; Certificate of Correction for U.S. Appl. No. 15/482,186, filed Apr. 7, 2017, dated Dec. 29, 2020, 1 pg.
Waltermire, Jamie; Corrected Notice of Allowance for U.S. Appl. No. 15/590,349, filed May 9, 2017, dated Dec. 22, 2020, 9 pgs.
Waltermire, Jamie; Corrected Notice of Allowance for U.S. Appl. No. 15/590,349, filed May 9, 2017, dated Feb. 5, 2021, 9 pgs.
Waltermire, Jamie; Non-Final Office Action for U.S. Appl. No. 16/293,716, filed Mar. 6, 2019, dated Feb. 5, 2021, 18 pgs.
Waltermire, Jamie; Corrected Notice of Allowance for U.S. Appl. No. 16/561,203, filed Sep. 5, 2019, dated Jan. 5, 2021, 9 pgs.
Waltermire, Jamie; Corrected Notice of Allowance for U.S. Appl. No. 16/561,203, filed Sep. 5, 2019, dated Feb. 5, 2021, 8 pgs.
Waltermire, Jamie; Non-Final Office Action for U.S. Appl. No. 16/689,407, filed Nov. 20, 2019, dated Jan. 8, 2021, 92 pgs.
Sollie, Greg; Corrected Notice of Allowance for U.S. Appl. No. 16/552,277, filed Aug. 27, 2019, dated Dec. 22, 2020, 7 pgs.
Sollie, Greg; Corrected Notice of Allowance for U.S. Appl. No. 16/552,277, filed Aug. 27, 2019, dated Feb. 9, 2021, 9 pgs.
Solie, Greg; Corrected Notice of Allowance for U.S. Appl. No. 15/845,540, filed Dec. 18, 2017, dated Dec. 21, 2020, 9 pgs.
Sollie, Greg; Corrected Notice of Allowance for U.S. Appl. No. 15/845,540, filed Dec. 18, 2017, dated Feb. 12, 2021, 8 pgs.
Collison, Alan B.; Corrected Notice of Allowance for U.S. Appl. No. 16/658,756, filed Oct. 21, 2019, dated Jan. 28, 2021, 3 pgs.
MP Global Products LLC: Office Action for European application No. 17868605.1, dated Dec. 3, 2020, 4 pgs.
MP Global Products, LLC; Examination Report for Australian patent application No. 2017359035, dated Nov. 27, 2020, 3 pgs.
MP Global Products, LLC; Office Action for Chinese patent application No. 201780081689.7, dated Nov. 2, 2020, 17 pgs.

(56) References Cited

OTHER PUBLICATIONS

Collison, Alan B.; Non-Final Office Action for U.S. Appl. No. 17/123,676, filed Dec. 16, 2020, dated Feb. 3, 2021, 23 pgs.
Sollie, Greg; Applicant-Initiated Interview Summary for U.S. Appl. No. 15/988/550, filed May 24, 2018, dated Dec. 24, 2020, 2 pgs.
Sollie, Greg; Final Office Action for U.S. Appl. No. 16/280,595, filed Feb. 20, 2019, dated Dec. 30, 2020, 25 pgs.
Sollie, Greg; Non-Final Office Action for U.S. Appl. No. 16/530,052, filed Aug. 2, 2019, dated Dec. 18, 2020, 17 pgs.
Sollie, Greg; Certificate of Correction for U.S. Appl. No. 16/567,192, filed Sep. 11, 2019, dated Feb. 16, 2021, 1 pg.
Sollie, Greg; Final Office Action for U.S. Appl. No. 16/408,981, filed May 10, 2019, dated Dec. 29, 2020, 22 pgs.
Sollie, Greg; Requirement for Restriction/Election for U.S. Appl. No. 16/886,040, filed May 28, 2020, dated Dec. 23, 2020, 6 pgs.
MP Global Products, LLC; First Examination Report for Australian patent application No. 2017359035, filed Nov. 7, 2017, dated Nov. 27, 2020, 3 pgs.
MP Global Products LLC: European Office Action for application No. 17868605.1, dated Dec. 3, 2020, 4 pgs.
MP Global Products LLC: European Office Action Response for application No. 17868605.1, filed Jan. 19, 2021, 15 pgs.

\* cited by examiner

TELESCOPING INSULATED BOXES

JOINT RESEARCH AGREEMENT

The subject matter disclosed was developed and the claimed invention was made by, or on behalf of, one or more parties to a joint research agreement between MP Global Products LLC of Norfolk, Nebr. and Pratt Retail Specialties, LLC of Conyers, Ga., that was in effect on or before the effective filing date of the claimed invention, and the claimed invention was made as a result of activities undertaken within the scope of the joint research agreement.

TECHNICAL FIELD

This disclosure relates to foldable boxes. More specifically, this disclosure relates to telescoping insulated boxes.

BACKGROUND

Home delivery of food is becoming more common as the process becomes more efficient and costs go down. Delivery boxes may alternatively need to keep the food hot or cold enough to, for example, prevent bacterial growth, prevent melting or congealing of the food, or simply maintain the edibility, texture, and flavor of the food. Another consideration for the type of box to use is its impact on the environment, as it relates to the reusability and recyclability of the boxes. Polystyrene foam boxes are prevalent in the food-delivery industry because of their low cost, but they are not commonly recycled. Thus, they take up a disproportionate volume of landfill space.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a telescoping insulated box assembly, comprising: an outer box, the outer box comprising a side wall and a bottom wall, the side wall and the bottom wall of the outer box each defining an insulation cavity; and an inner box, the inner box comprising a side wall and a wall forming a portion of a top side of the box assembly, each wall of the inner box defining an insulation cavity, the inner box sized to fit into the outer box such that the each of the side walls of the inner box faces one of the side walls of the outer box.

Also disclosed is A method of assembling a telescoping insulated box assembly, comprising: assembling an outer box by folding an inner side panel into the outer box, the inner side panel joined to a connecting strip by a fold line, the connecting strip joined to an outer side panel by a fold line, the outer side panel, the connecting strip, and the inner side panel forming a side wall and defining an insulation cavity therebetween; assembling an inner box by folding an inner side panel of the inner box into the inner box, the inner side panel joined to a connecting strip by a fold line, the connecting strip joined to an outer side panel by a fold line, the outer side panel, the connecting strip, and the inner side panel forming a side wall and defining an insulation cavity of the inner box therebetween; and inserting the inner box into the outer box, such that an open top of the inner box is proximate a bottom of the outer box, and a bottom of the inner box forms a portion of a top side of the box assembly.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1A:
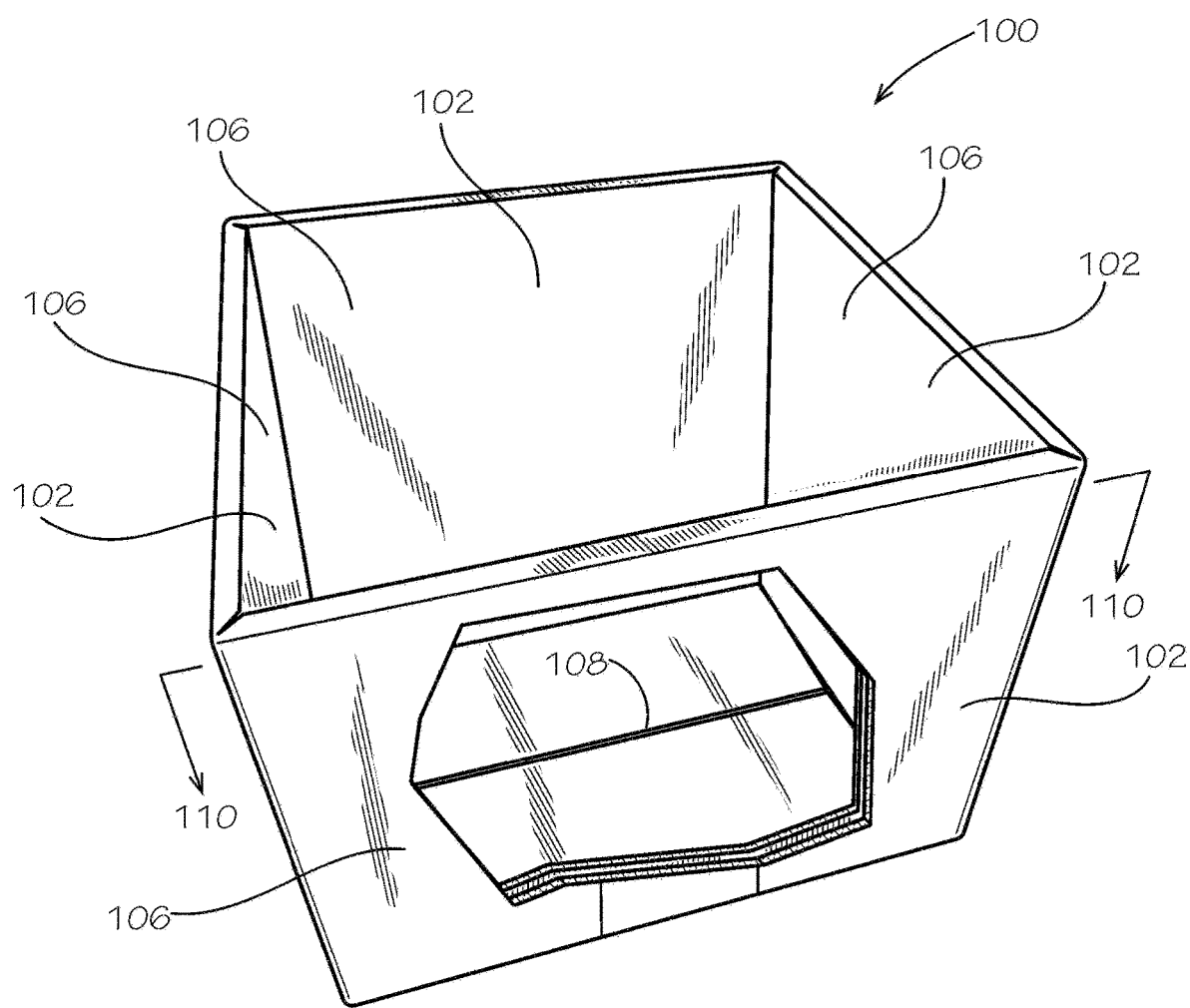
FIG. 1A shows a box comprising walls defining insulation cavities therein.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure.

It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a telescoping insulated box and associated methods, systems, devices, and various apparatus. It would be understood by one of skill in the art that the disclosed box is described in but a few exemplary embodiments among many. No particular terminology or description should be considered limiting on the disclosure or the scope of any claims issuing therefrom.

For ease of understanding, the use of the directional terms herein, such as right, left, front, back, top, bottom, and the like can refer to the orientation shown and described in the corresponding figures, but these directional terms should not be considered limiting on the orientation or configuration required by the present disclosure. The use of ordinal terms herein, such as first, second, third, fourth, and the like can refer to elements associated with elements having matching ordinal numbers. For example, a first light bulb can be associated with a first light socket, a second light bulb can be associated with a second light socket, and so on. However, the use of matching ordinal numbers should not be considered limiting on the associations required by the present disclosure.

FIG. 1A shows in one exemplary aspect a box 100 comprising walls 102 defining insulation cavities 104 within each of the walls 102. The walls 102 can comprise a plurality of sides 106 and a bottom 108 of the box 100. The box 100 can comprise four or any other number of sides 106. The sides 106 and the bottom 108 can define an interior 110 of the box 100. The sides 106 and the bottom 108 can comprise the insulation cavities 104 when the box 100 is assembled in accordance with the present disclosure. Line 110-110 defines a cross-section, a perspective view of which is shown in FIG. 1B.

Figure 1B:
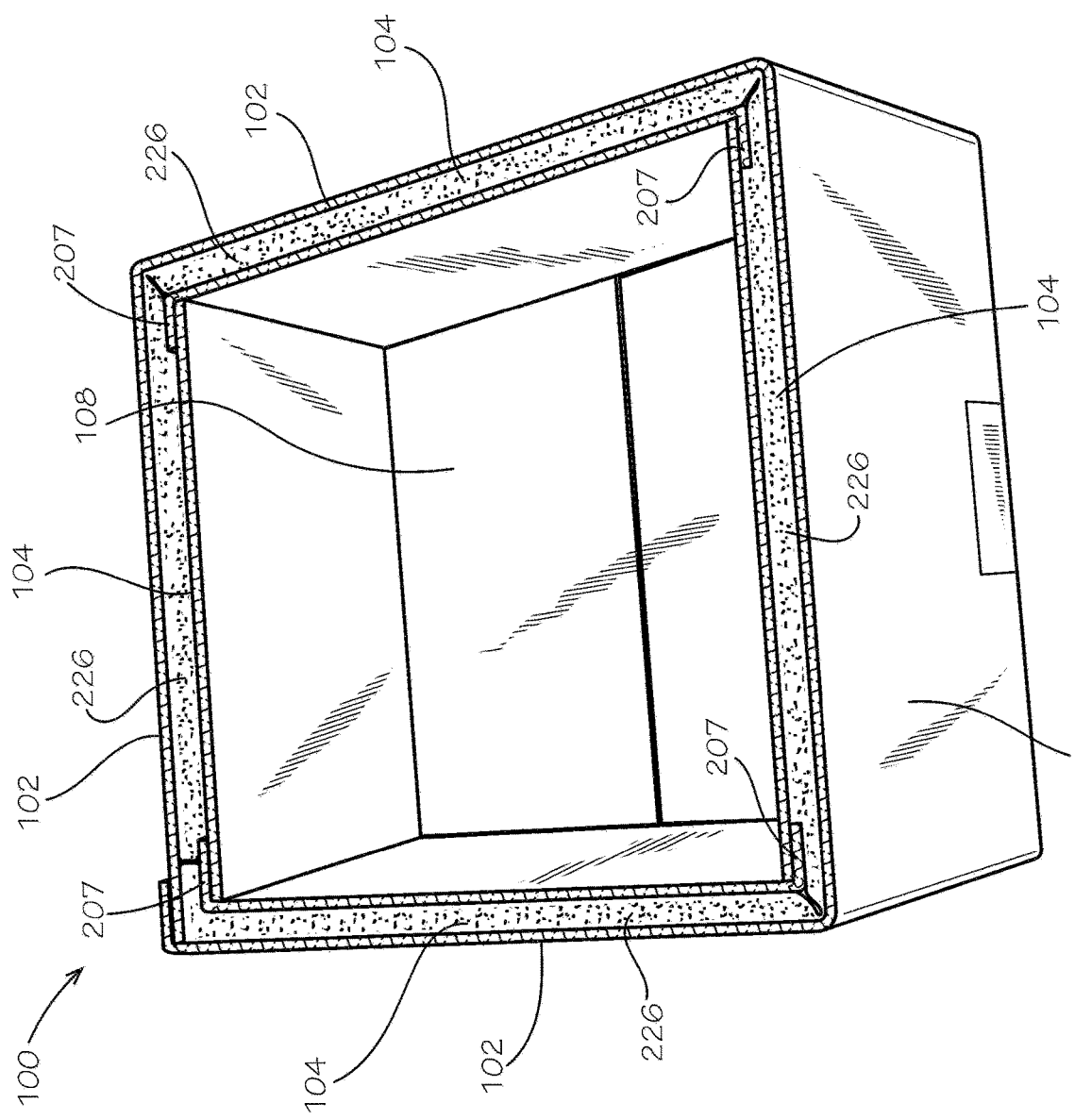
FIG. 1B shows a cross-section of the box of FIG. 1A taken along line 110 of FIG. 1A.

FIG. 1B is a cross-sectional view of the box 100 of FIG. 1A. The cross-sectional plane is defined by line 110-110. The insulation cavities 104 can be defined within each of the walls 102, the construction of the walls 102 being described more fully below. In the current aspect, the insulation cavities 104 are empty and filled with air. In other aspects, various insulators such as repulpable or recyclable insulator pads 226 (described below) can fill the cavities 104.

Figure 2:
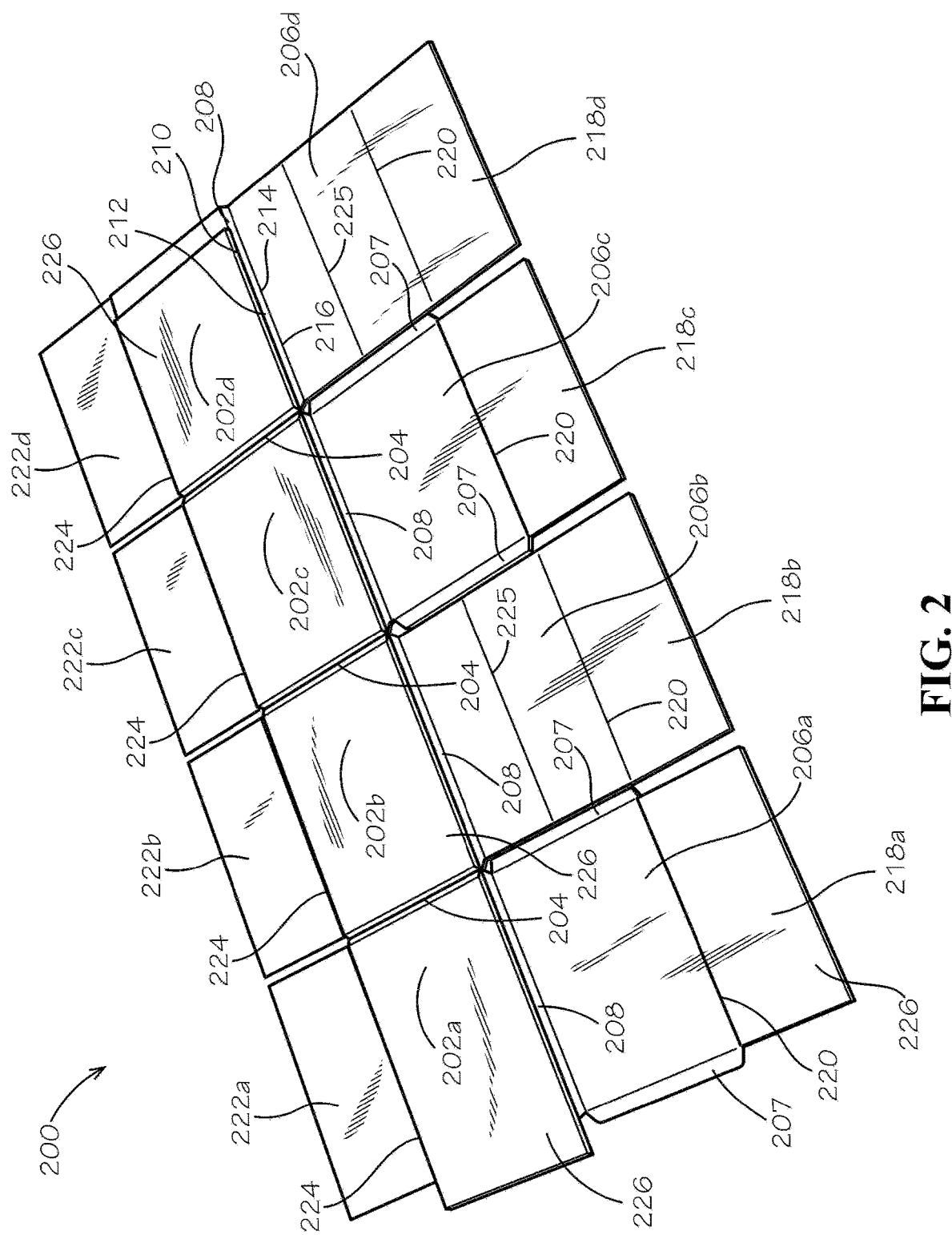
FIG. 2 shows a blank configured to form the box of FIG. 1.

FIG. 2 shows in one exemplary aspect a blank 200 configured to form the box 100 of FIG. 1. The blank 200 can comprise four outer side panels 202a,b,c,d, each connected to another by a parallel fold line 204. Each of four inner side panels 206a,b,c,d can be connected to one of the four outer side panels 202a,b,c,d by a connecting strip 208. Each connecting strip 208 can be connected to the respective outer side panel 202a,b,c,d by a fold line 210 along one edge 212 and be connected to respective the inner side panel 206a,b, c,d by a fold line 214 on an opposite edge 216. Each of a first and a third inner side panel 206a,c can comprise two tabs 207. Each of four inner bottom panels 218a,b,c,d can be connected to one of the four inner side panels 206a,b,c,d by a fold line 220. The blank can also comprise four outer bottom panels 222a,b,c,d, each connected to one of the four outer side panels 202a,b,c,d by a fold line 224.

Each of the four outer side panels 202a,b,c,d can be covered by an insulator pad or batt 226. The insulator pads 226 can comprise paper or other paper fiber materials; however, in other aspects, the insulation batts 226 can comprise cotton, foam, rubber, plastics, fiberglass, mineral wool, or any other flexible insulation material. In the present application, the insulation batts 226 can be repulpable. In the present aspect, the box can be 100% recyclable. In the present aspect, the box 100 can be single-stream recyclable wherein all materials comprised by the box can be recycled by a single processing train without requiring separation of any materials or components of the box 100. In the present aspect, the box 100 can be compostable. In the present aspect, the box 100 can be repulpable. In the present aspect, the box 100 and the insulator pads 226 can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. which is hereby incorporated in its entirety. In the present aspect, the box 100 and the insulator pads 226 can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill.

Recyclable and repulpable insulation materials are further described in U.S. patent application Ser. No. 15/677,738, filed Aug. 15, 2017, U.S. Provisional Patent Application No. 62/375,555, filed Aug. 16, 2016, U.S. Provisional Patent Application No. 62/419,894, filed Nov. 9, 2016, and U.S. Provisional Patent Application No. 62/437,365, filed Dec. 21, 2016, which are each incorporated by reference in their entirety herein.

The insulator pads 226 can be configured or spaced to allow bending of the fold lines 204 between each of the outer side panels 202*a,b,c,d* such that the insulator pads 226 face the interior 110 of the box 100. A first and a third inner bottom panel 218*a,c* can also be covered by insulator pads 226. The insulator pads 226 can be affixed to the panels by glue, hot melt, double-sided tape, or any other method known in the art. In other aspects (not shown), insulator pads 226 can be omitted altogether. In such case, the insulation cavities 104 can use air as an insulating material.

In other aspects (not shown), the number of outer side panels 202*a,b,c,d* (and corresponding panels) can be greater or less than four. In yet other aspects, the tabs 207 need not be on the first and third inner side panels 206*a,c*, and can be on any desired side panel 206.

The insulator pad 226 covering a fourth outer side panel 202*d* can be cut short, and the insulator pad 226 covering a first outer side panel 202*a* can extend past its edge, such that when the first and fourth outer side panels 202*a,d* are joined together—assembling the box in a 3-D configuration—the insulator pad 226 extending from the first outer side panel 202*a* can touch and can cover a portion of the fourth outer side panel 202*d*. In some aspects, the first outer side panel 202*a* can comprise a tab (not shown) that extends outward similar to the tab 207 of the first inner side panel 206*a* and the insulator pad 226 can cover the tab of the first outer side panel 202*a*. In these aspects, the tab beneath the insulator pad 226 covering the first outer side panel 202*a* can contact and can cover a portion of the fourth outer side panel 202*d* instead of the insulator pad 226.

Figure 3:
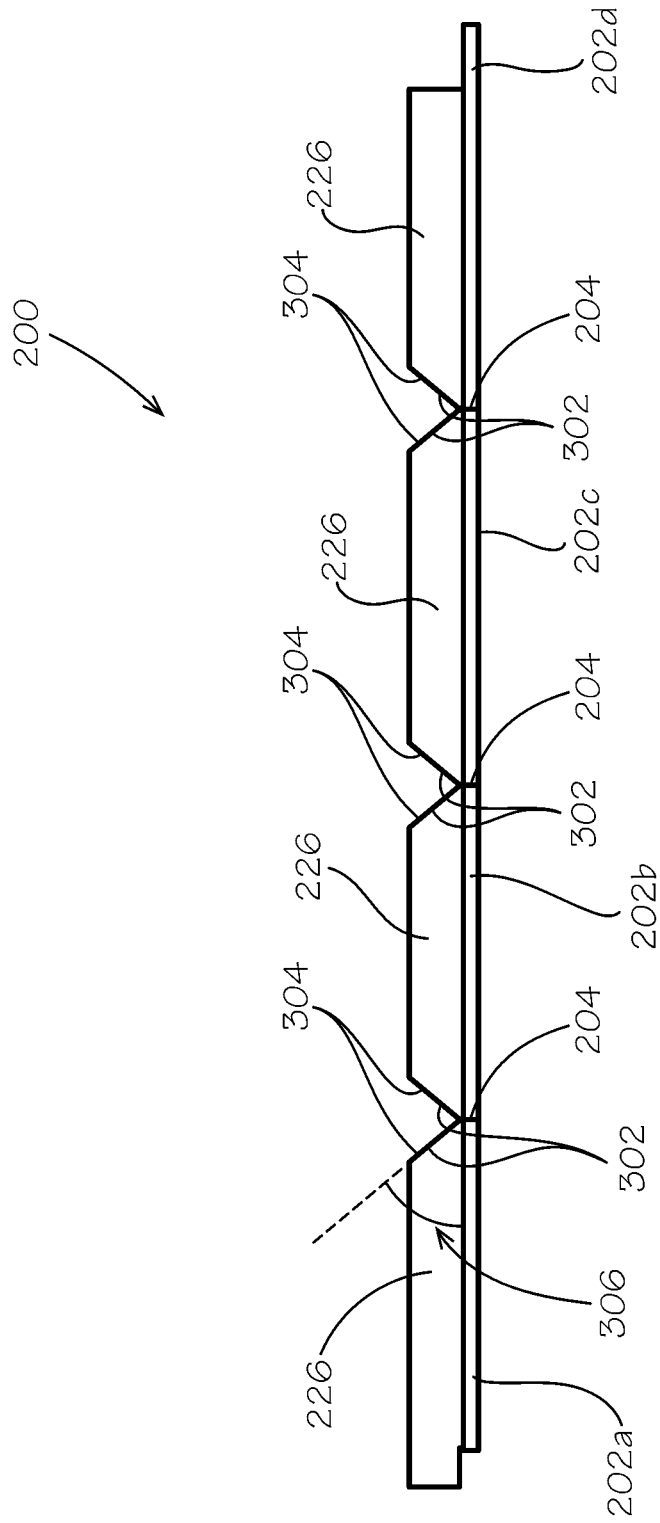
FIG. 3 shows a side view of the blank of FIG. 2.

FIG. 3 shows a side view of the blank 200 of FIG. 2. The insulator pads 226 can be cut along each of their edges 302 at the fold lines 204 between the outer side panels 202*a,b,c,d*. For example, each cut 304 can form an angle 306 with a plane of the blank 200. The angle 306 can be 45-degrees, such that when the box 100 walls 102 each form a 90-degree angle relative to each other, the cuts 304 of the insulator pads 226 are in facing or almost facing contact but are not compressed against each other.

Figure 4:
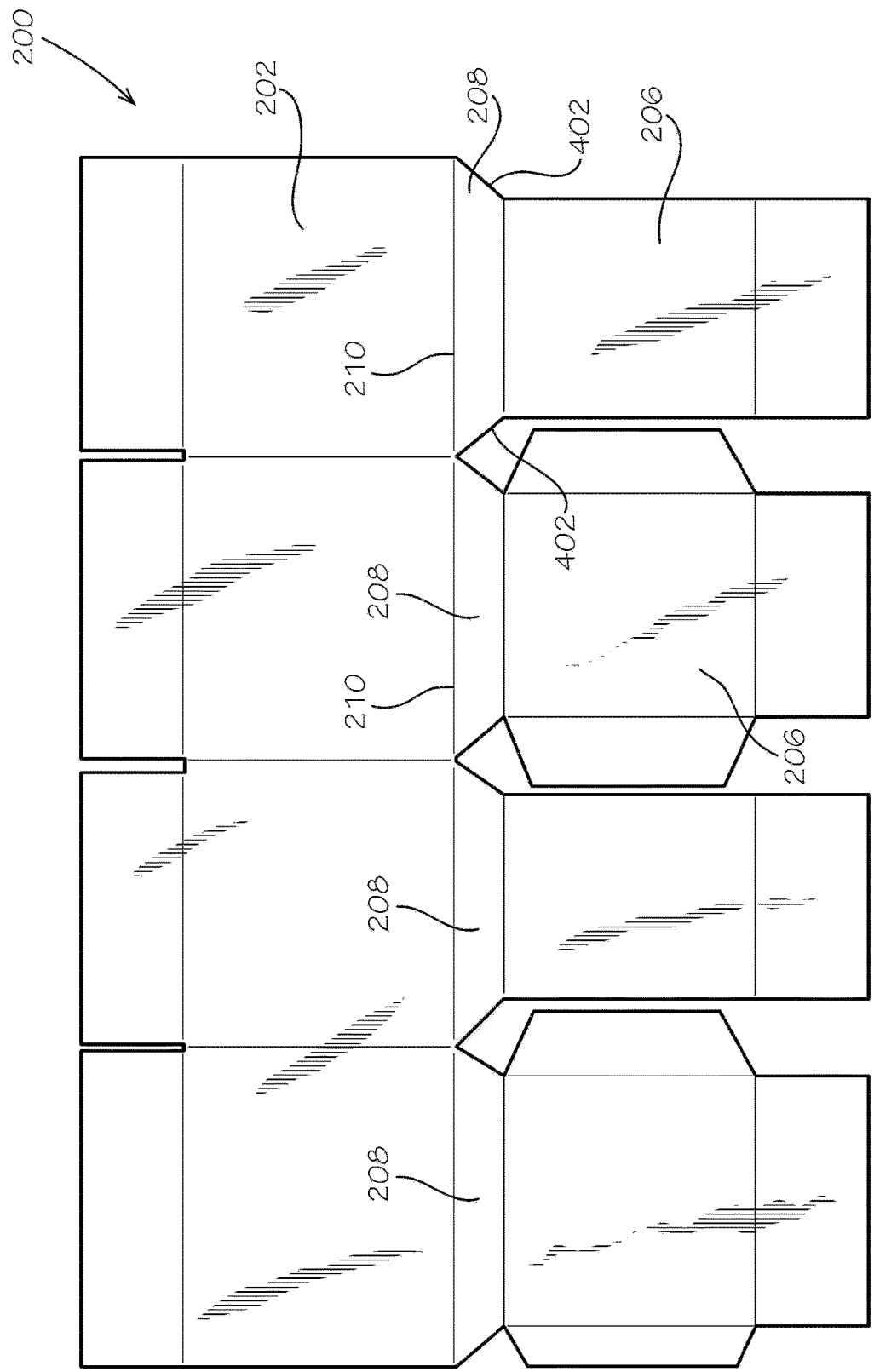
FIG. 4 shows a blank configured to form a box, in accordance with another aspect of the current disclosure.

FIG. 4 shows another aspect of the blank 200 for the box 100 in accordance with the current disclosure. In the current aspect, the insulator pads 226 are omitted. The insulator pads 226 can be inserted during assembly of the box 100 or omitted. The connecting strips 208 can each comprise sides 402 which are angled towards each other in the direction of the inner side panels 206 from the outer side panels 202. For example and without limitation, the sides 402 of the connecting strips 208 can form approximately a 45-degree angle with the fold line 210 between the connecting strip 208 and the outer side panel 202. In this way, the connecting strips 208 can form a top surface 602 (shown in FIG. 6) of the box 100, each side 402 of the connecting strips 208 in facing or almost facing contact with, without overlapping, one of the sides 402 of the adjacent connecting strips 208.

Figure 5A:
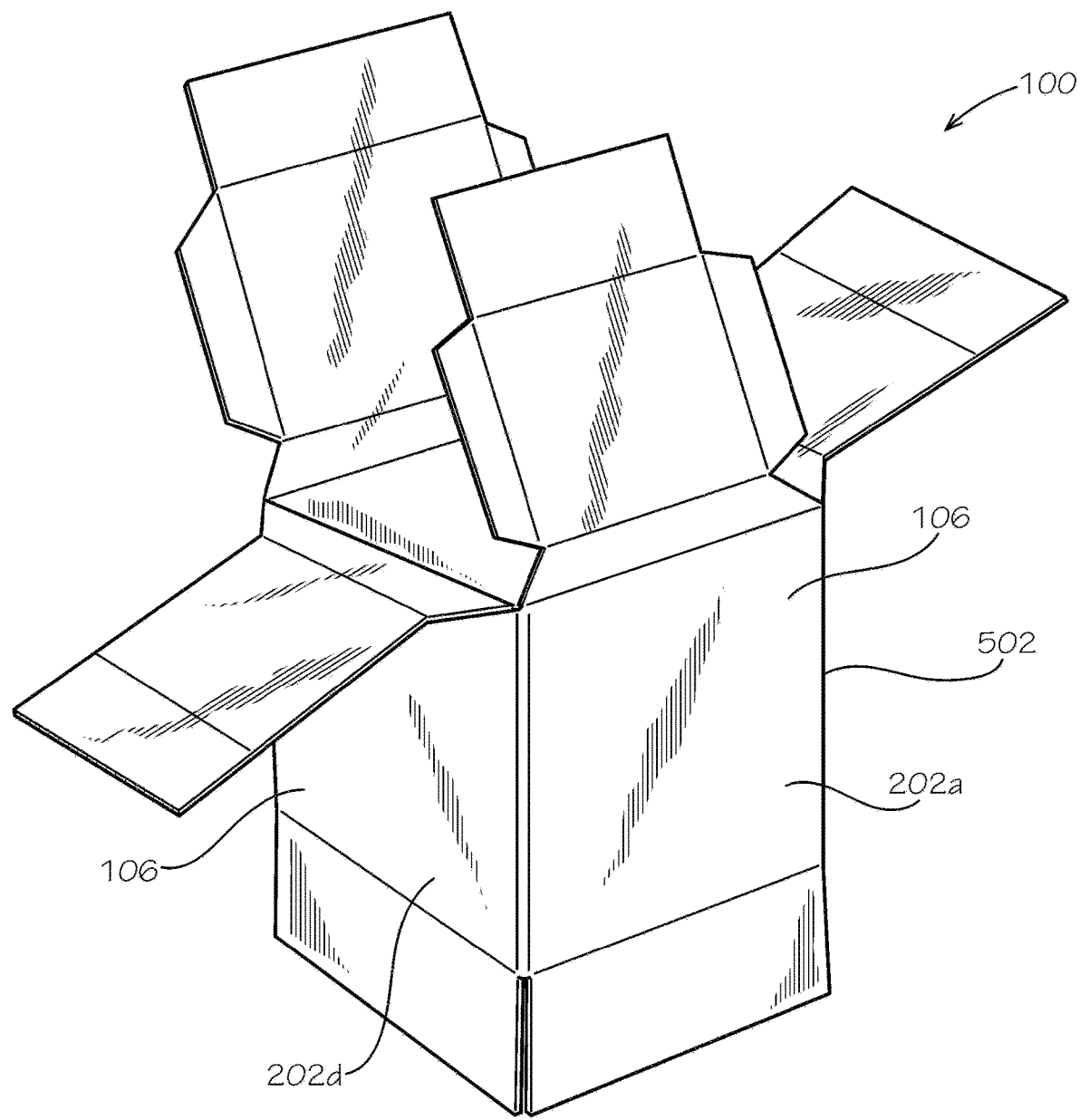
FIG. 5A shows the box corresponding to the blank of FIG. 4, in a partially assembled configuration.

FIG. 5A shows the box 100 corresponding to the blank of FIG. 4, in a partially assembled configuration. The first and the fourth outer side panels 202*a,d* are joined to form a ring 502 comprising the four sides 106 of the box 100.

Figure 5B:
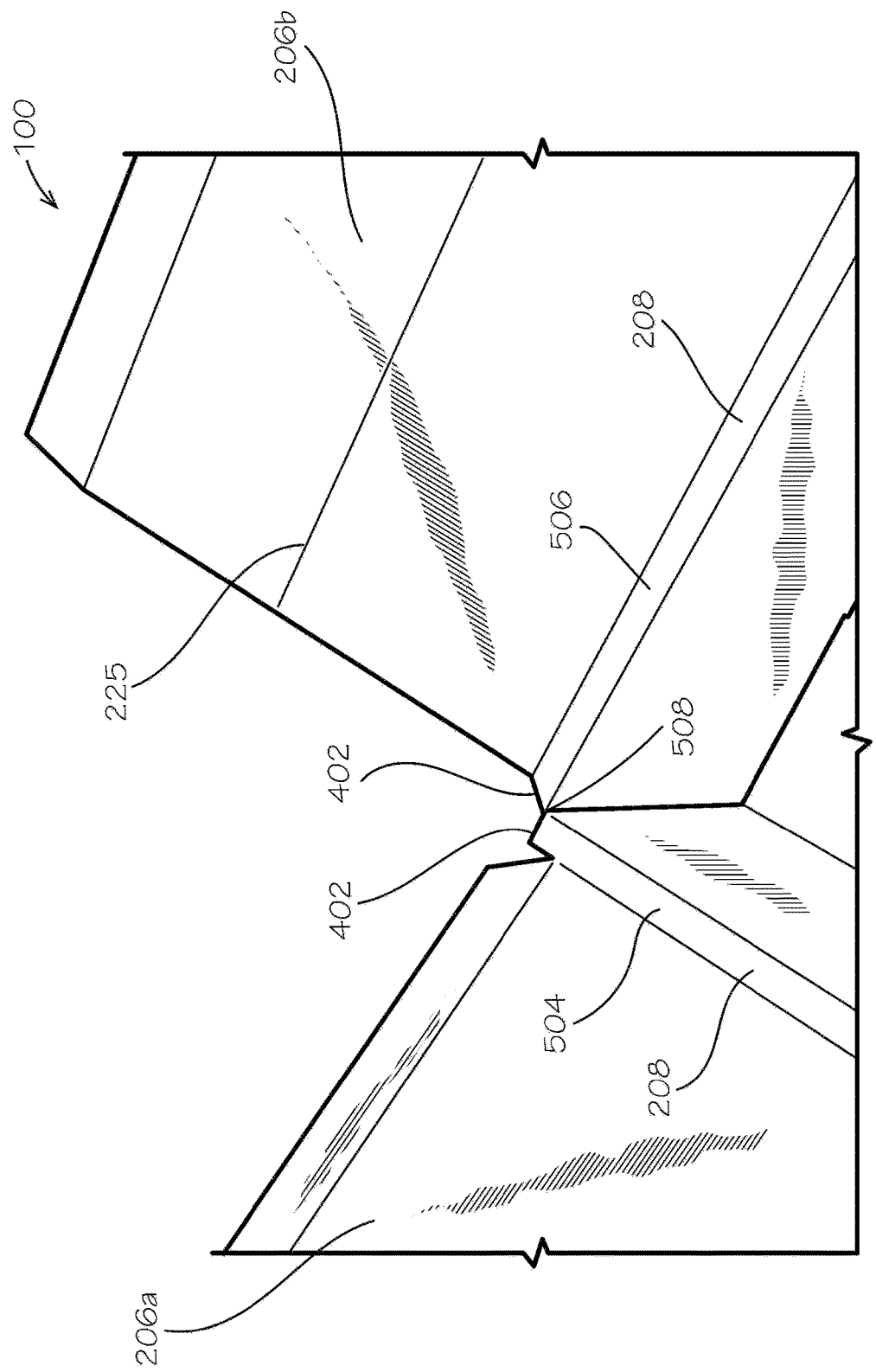
FIG. 5B is a detail view of the box, in accordance with another aspect of the current disclosure.

FIG. 5B is a detail view of the box 100, in accordance with another aspect of the current disclosure. In the present aspect, the box 100 can be assembled from a blank in which the connecting strips 208 can alternate between a rectangular shape 504 (the sides 402 of the connecting strips 208 perpendicular to the fold line 210 between the connecting strip 208 and the outer side panel 202) and a trapezoidal shape 506 (as shown in FIG. 4). The two opposing inner side panels 206*a,c* connected to the rectangular connecting strips 504 can fold into the box 100 first, followed by the opposing inner side panels 206*b,d* connected to the trapezoidal connecting strips 506. In other aspects, different inner side panels 206*a,b,c,d* can have or be attached to the rectangular 504 or trapezoidal connecting strips 506. As such, the angled sides 402 of the trapezoidal connecting strips 506 can provide a symmetric look to the corners 508 of the box, while the sides 402 of the rectangular connecting strips 504 can be tucked under the trapezoidal connecting strips 506, such that no gap is defined therebetween to see inside the insulation cavities 104. Additionally, in some aspects, the box 100 can be dimensioned such that some of the inner side panels 206*a,b,c,d* cannot easily fold into the box 100 without bending. In such cases, an additional fold line 510 across the inner side panel 206*a,b,c,d* can allow for easier assembly.

Figure 6:
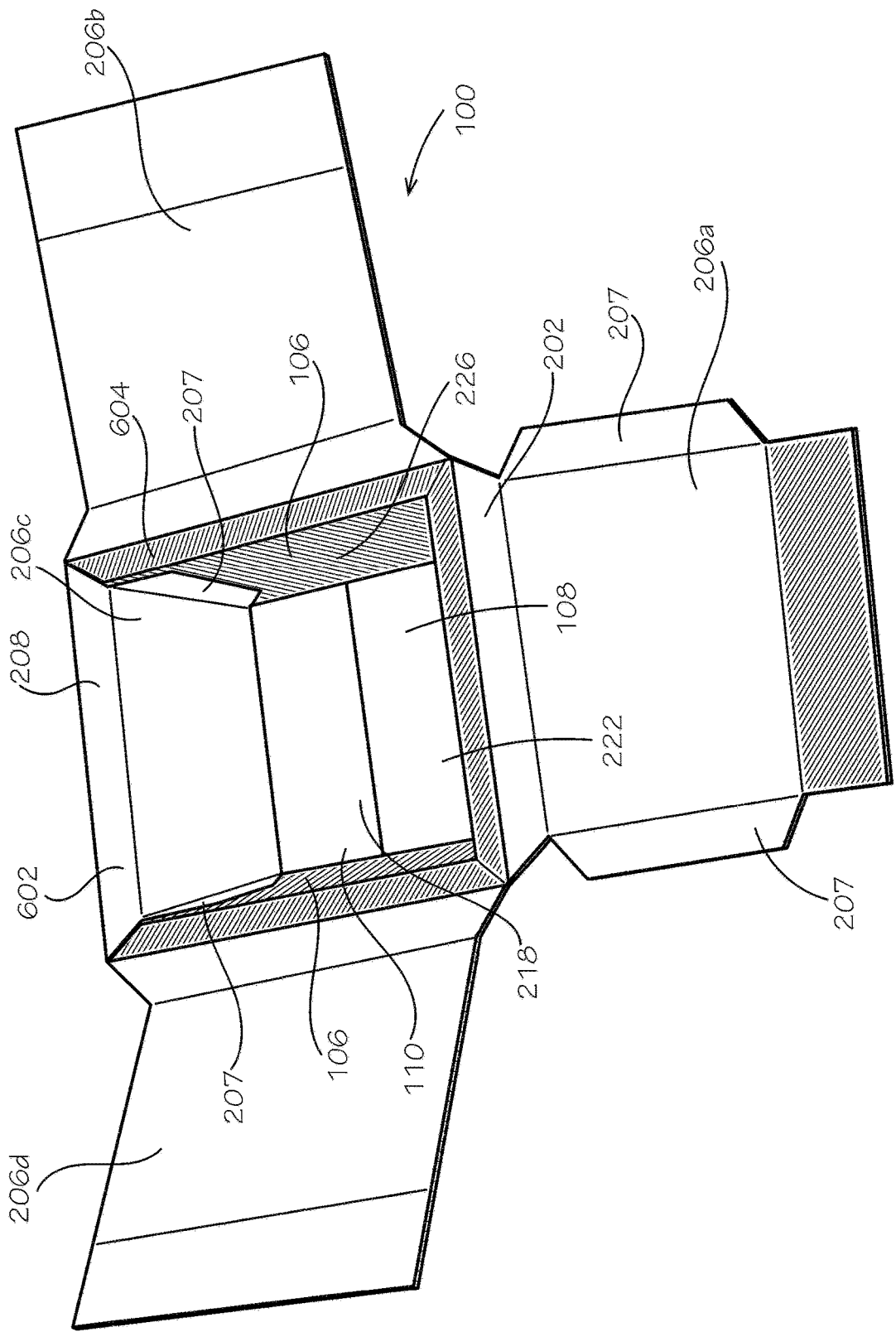
FIG. 6 shows the box comprising insulator pads, wherein an inner side panel is folded into the box.

FIG. 6 shows the box 100 having the insulator pads 226 (shaded), wherein one of the inner side panels 206 has been folded into the box 100. The connecting strip 208 can cover a top edge 604 of the insulator pad 226. Each inner side panel 206*a,b,c,d* can face the corresponding outer side panel 202*a,b,c,d* (not shown in FIG. 6) and sandwich a respective one of the insulator pads 226 in each cavity 104 formed therebetween. The tabs 207 can fold to face the adjacent sides 106 of the box 100. The inner bottom panel 218 can form the bottom 108 of the interior 110 of the box 100. Another one of the insulating pads 226 (not shown) can be sandwiched between the inner bottom panel 218 and the outer bottom panels 222.

The blank 200 of FIG. 2 can be assembled to form the box 100 in its 3-D configuration by a following procedure. The first and the fourth outer side panels 202*a,d* can be joined together such that the insulator pads 226 face the interior 110 of the box 100. The outer bottom panels 222*a,b,c,d* can be folded to form the bottom 108 of the box 100. For example, the first and the third outer bottom panels 222*a,c* can be folded in first, followed by the second and fourth outer bottom panels 222*b,d*. The inner side panels 206*a,b,c,d* can be folded in towards the interior 110 of the box 100, such that the inner side panels 206*a,b,c,d* contact the insulator pads 226, and such that the inner bottom panels 218a,b,c,d face and lay over the outer bottom panels 222a,b,c,d. In the current aspect, for the blank 200 shown in FIG. 2, the first and the third inner side panels 218a,c can be folded in first, such that the tabs 207 of the first and third inner side panels 218a,c are sandwiched between the second and fourth outer side panels 202b,d and the corresponding second and fourth inner side panels 218b,d. In another aspect, the second and fourth side inner panels 202b,d can be folded into the box 100 first, and then the first and third inner side panels 218a,c subsequently folded in, such that the tabs 207 are exposed to the interior 110 of the box 100 in the assembled configuration. This method can use the tabs 207 to hold down the second and fourth inner side panels 202b,d, while the previous method can allow the tabs 207 to remain hidden.

Furthermore, in the current aspect, the insulator pads 226 on the first and third inner bottom panels 218a,c can touch the outer bottom panels 222a,b,c,d. The second and fourth inner bottom panels 218b,d can then form the bottom 108 facing the interior 110 of box 100. In other aspects, the order of folding can be different, such that the bottom 108 and the sides 106 of the box still comprise insulation cavities 104.

In other aspects, such as when the number of outer side panels 202a,b,c,d (and corresponding panels) vary from four, the procedure can be described more generally by the following steps: joining the outer side panels 202a,b,c,d at opposite ends 202a,d such that the outer side panels 202a,b,c,d form a ring 502; folding the outer bottom panels 222a,b,c,d to form the bottom 108 of the box 100, the bottom 108 and the ring 502 of outer side panels 202a,b,c,d defining the interior 110 of the box 100; folding the inner side panels 206a,b,c,d in towards the interior 110 of the box 100, such that the connecting strips 208 cover the top edges 604 of the insulator pads 226, and such that each inner side panel 206a,b,c,d faces the corresponding outer side panel 202a,b,c,d; and folding the inner bottom panels 218a,b,c,d to face the bottom 108 of the box 100.

Figures 7, 8:
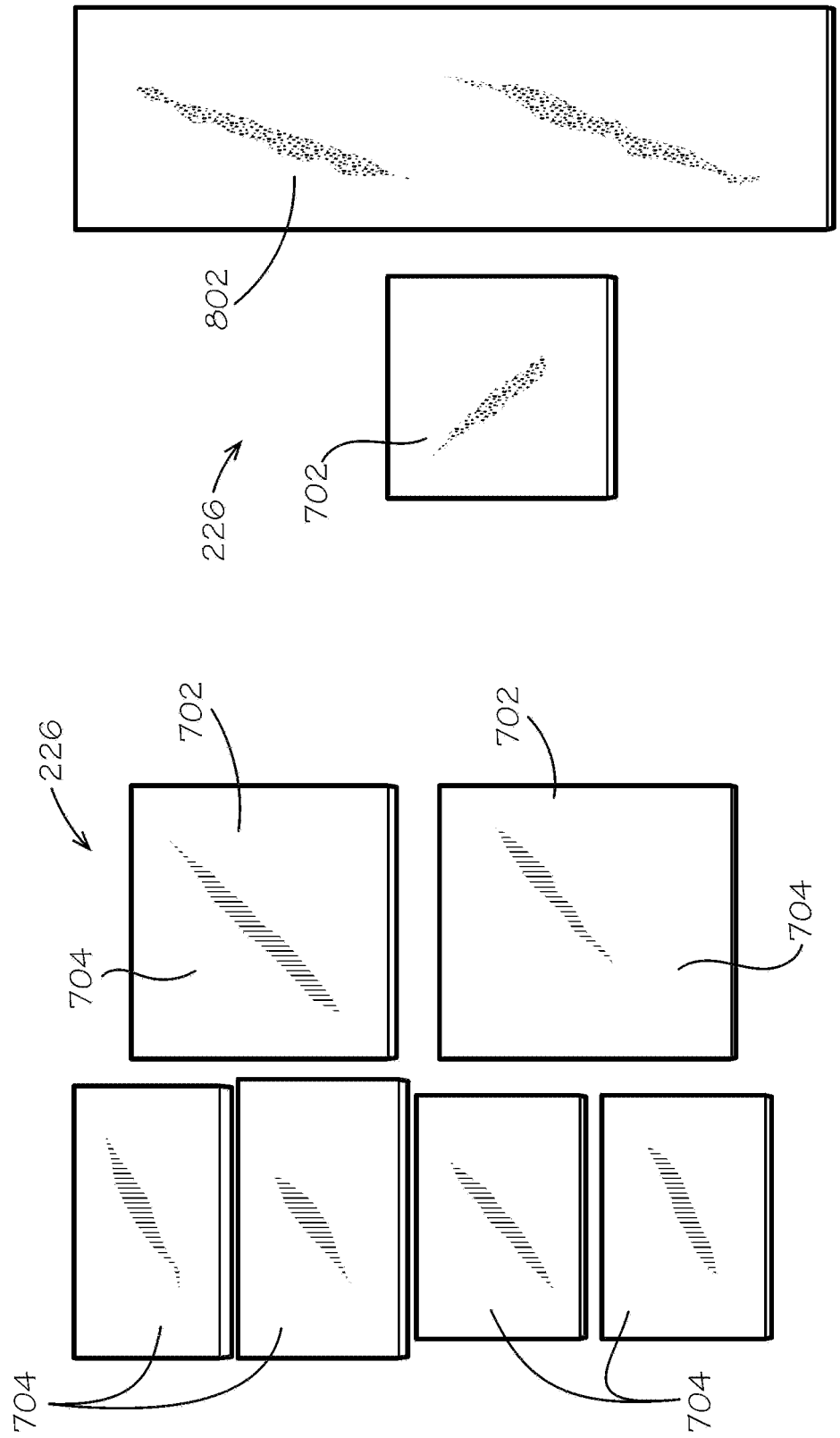
FIG. 7 shows a plurality of insulator pads, in accordance with another aspect of the current disclosure.
FIG. 8 shows the insulator pads, in accordance with another aspect of the current disclosure.

FIG. 7 shows another aspect of the insulator pads 226. In the present aspect, the insulator pads 226 can be individual pieces, unattached to a blank and inserted into the insulation cavities 104 during the assembly of the box 100. Two bottom insulation pads 702 can insulate the insulation cavity 104 of the bottom 108 of the box 100, which can also be called a bottom insulation cavity. The insulator pads 226 can comprise a covering or liner 704 that can be made of plastic, for example and without limitation, such that moisture is prevented from entering an interior of the insulator pads 226.

FIG. 8 shows another aspect of the insulator pads 226. In the present aspect, a singular side insulator pad 802 can fill a plurality of insulation cavities 104 (side insulation cavities) by wrapping circumferentially in the walls 102 of the sides 106 (side walls). A separate bottom insulation pad 702 can insulate the bottom insulation cavity.

Figure 9:
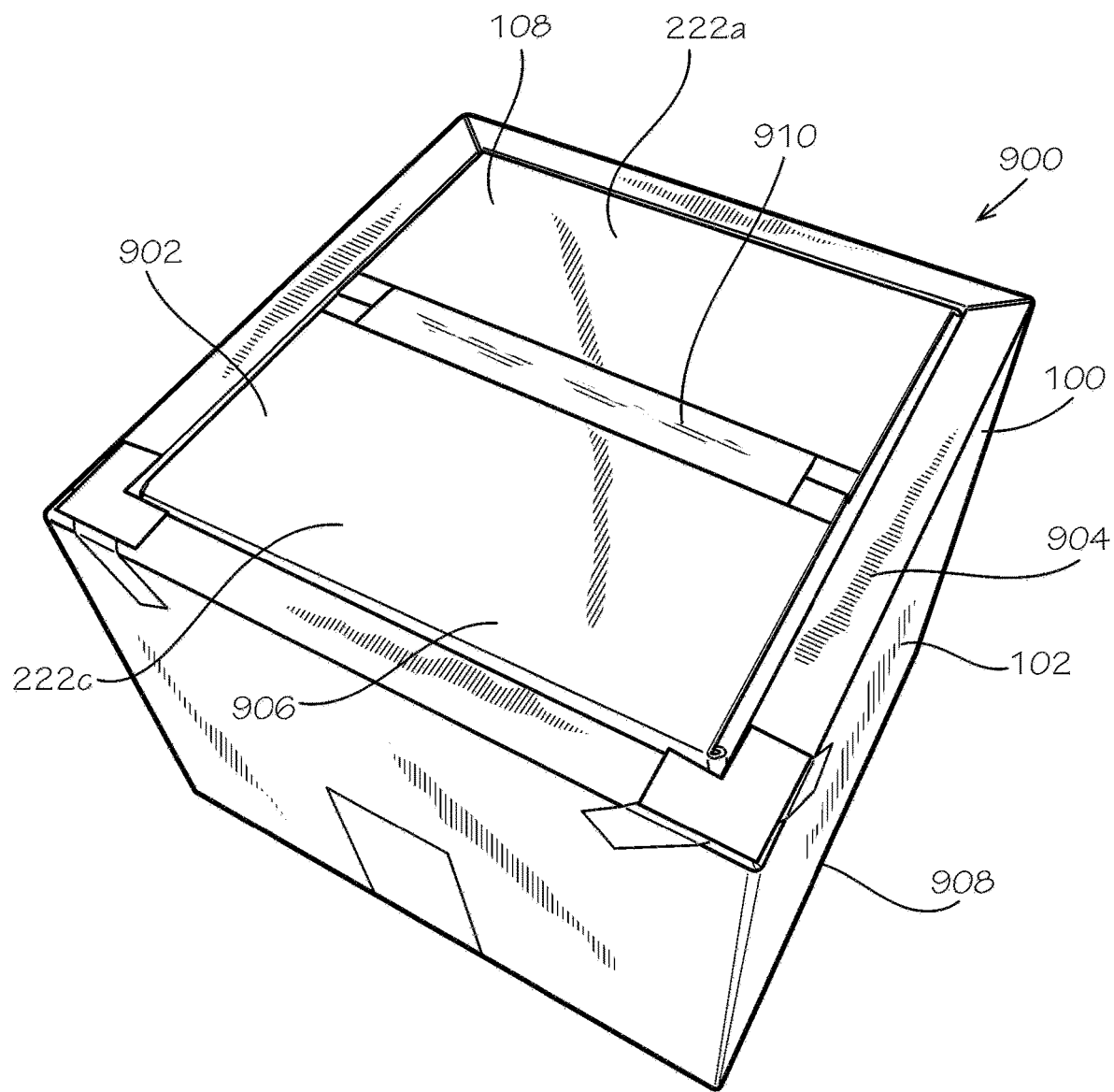
FIG. 9 is a perspective view of a telescoping insulated box.

FIG. 9 is a perspective view of a telescoping insulated box assembly 900. The telescoping insulated box assembly 900 can comprise an inner box 902 and an outer box 904. Each of the inner box 902 and the outer box 904 can be assembled according to the present disclosure as a box 100 comprising walls 102 that define insulation cavities 104 (shown in FIG. 2). The telescoping box assembly 900 can be formed by the inner box 902, which is smaller than the outer box 904, upside down into the outer box 904, such that the bottom 108 of the box 100 forming the inner box 902 is a part of a top side 906 of the telescoping box assembly 900 opposite to a bottom side 908 of the telescoping box assembly 900, the bottom side 908 formed by the bottom 108 of the outer box 904. In other aspects (not shown), the telescoping box assembly 900 can be in a reversed orientation while carry contents, such that the bottom 108 of the outer box 904 can form the top side 906 of the telescoping box assembly 900 and the bottom 108 of the inner box 902 can form part of the bottom side 908 of the telescoping box assembly 900. The inner box 902 can be sized such that the inner box 902 slides snugly into the outer portion. Snugly can mean that the inner and outer portions 902, 904 in an assembled telescoping box assembly 900 can press against each other with enough force such that frictional forces alone can keep the inner and outer portions 902, 904 secured together, such that the portions 902, 904 do not separate through gravitational forces when the telescoping box assembly 900 is empty or filled with contents up to a given weight and external force needs to be applied to separate the boxes 902, 904. In other aspects, the fit can be designed to be looser or tighter as desired.

When the inner box 902 forms part of the top side 906 of the telescoping box assembly 900, a handle 910 can be attached to the inner box 902. In some aspects, the handle 910 can be a strip of flexible plastic, the ends of which are adhesive, such that the handle also functions to secure the outer bottom panels 222a,b,c,d of the inner box 902 together. The handle 910 can be of sufficient strength to support the weight of the telescoping box assembly 900 and its contents, as well as to support pulling the inner box 902 out of the outer box 904 in order, for example, to retrieve the contents.

Figure 10:
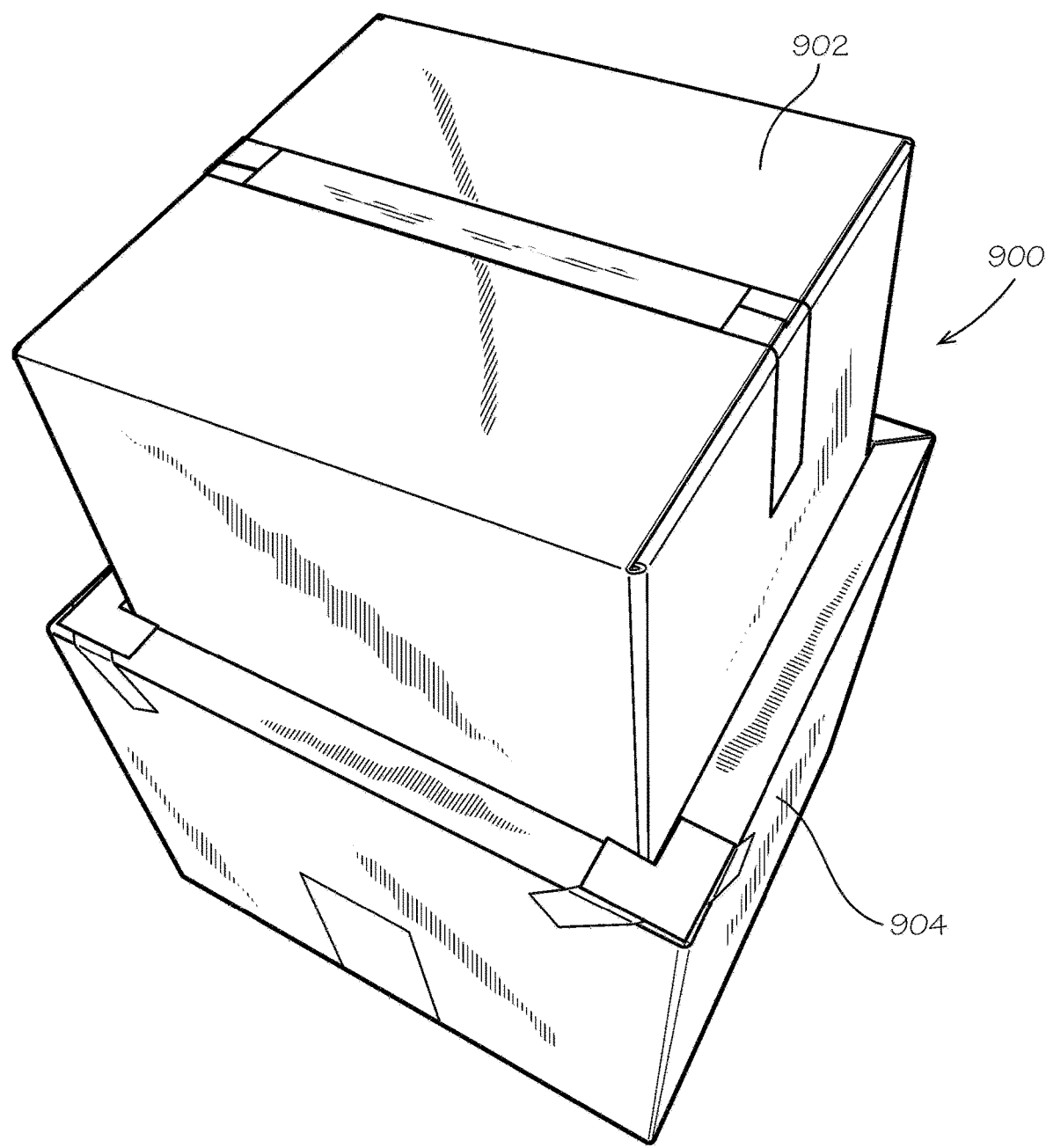
FIG. 10 is a perspective view of an inner portion of the telescoping box partially inserted in an outer portion.

FIG. 10 is a perspective view of the inner box 902 of the telescoping box assembly 900 partially inserted in (or telescoping from) the outer box 904.

Figure 11:
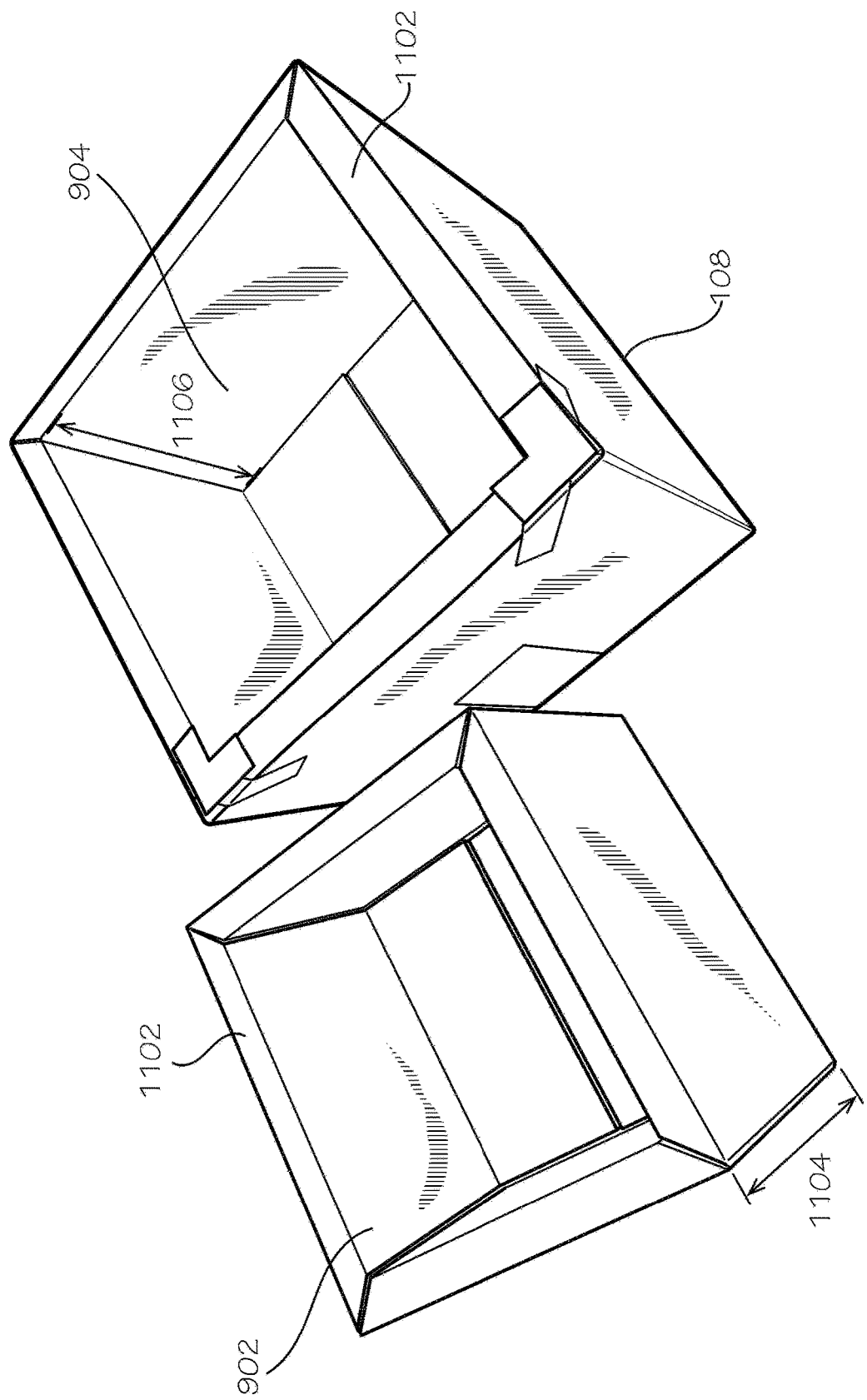
FIG. 11 is a perspective view of the inner portion side-by-side with the outer portion.

FIG. 11 is a perspective view of the inner box 902 placed side-by-side with the outer box 904, both portions facing in the same orientation, their bottoms 108 facing down and a top edge 1102 facing up. An exterior height 1104 of the inner box 902 can match an interior height 1106 of the outer box 904, such that when the inner box 902 is fully inserted into the outer box 904, the bottom 108 of the inner box 902 is level, or coplanar, with the top edge 1102 of the outer portion 104.

Figure 12:
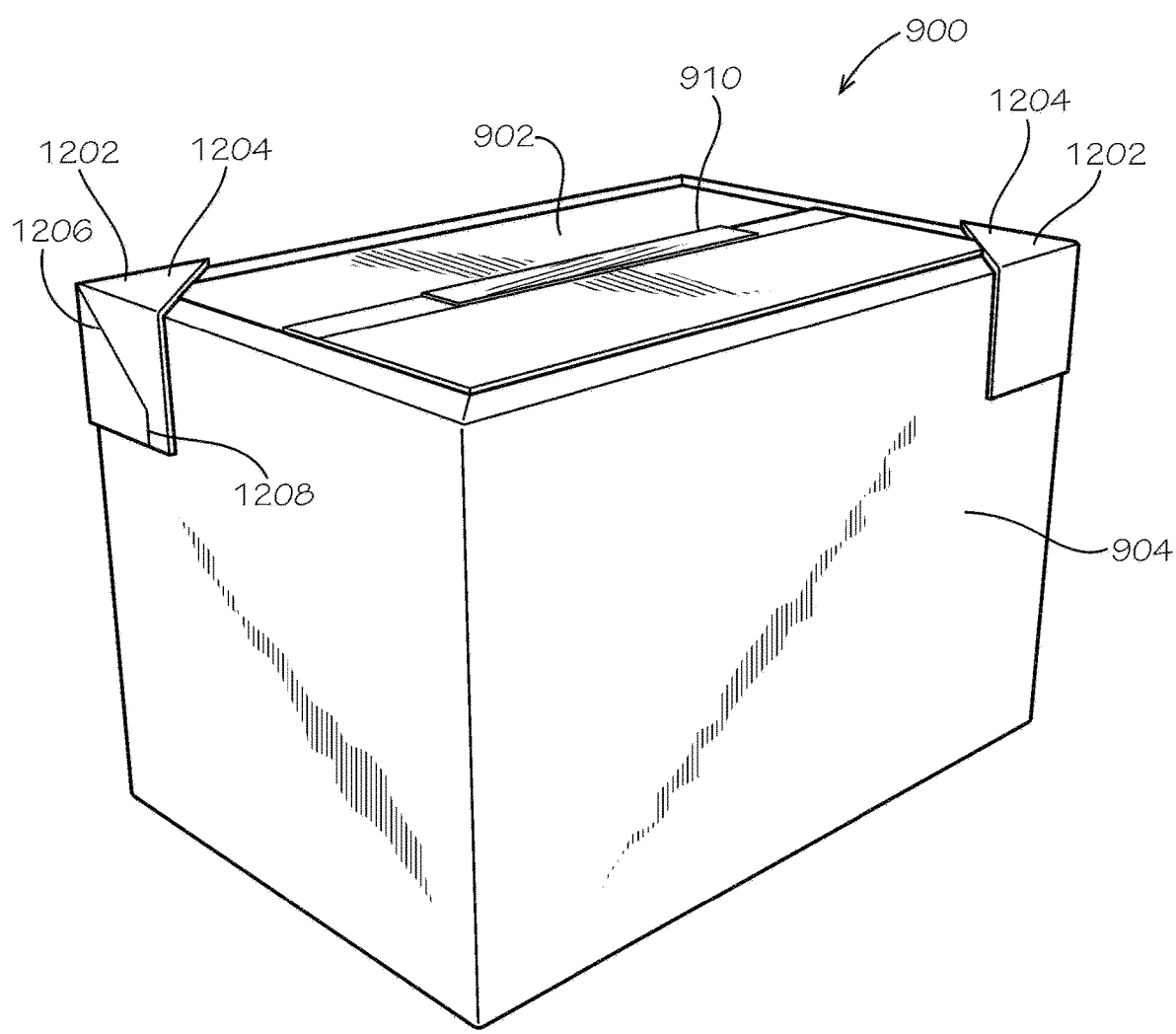
FIG. 12 is a perspective view of the telescoping box comprising access tabs.

FIG. 12 is a perspective view of the telescoping box assembly 900 comprising access tabs 1202. Each access tab 1202 can comprise a telescope covering portion 1204 that can cover a corner (not shown) of the inner box 902, such that the inner box 902 is secured inside the outer box 904. The tabs 1202 can be attached to the outer box 904, such as by adhesives such as glue. Each tab 1202 can define cuts 1206 and perforations 1208 such that tearing a portion of the tab 1202 along the perforation 1208 can allow the covering portion 1204 to fold up and expose the corner of the inner box 902. As such, the inner box 902 can be removed from the outer box 904 after tearing the portion of the tab 1202 along the perforation 1208, such as by holding the outer box 904 and pulling on the handle 910 of the inner box 902 in an opposite direction.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A telescoping insulated box assembly, comprising:
   an outer box, the outer box comprising a side wall and a bottom wall, the side wall and the bottom wall of the outer box each defining an insulation cavity;
   an inner box, the inner box comprising a side wall and a wall forming a portion of a top side of the box assembly, each wall of the inner box defining an insulation cavity, the inner box sized to fit into the outer box such that the each of the side walls of the inner box faces one of the side walls of the outer box; and
   a handle attached to the inner box on the wall forming the portion of the top side of the box assembly.

2. The box assembly of claim 1, wherein:
   the side wall of the outer box comprises
   an outer side panel;
   a connecting strip joined to the outer side panel by a fold line; and
   an inner side panel joined to the connecting strip by a fold line; and
   wherein the outer side panel, the connecting strip, and the inner side panel define the insulation cavity therebetween.

3. The box assembly of claim 2, wherein:
   the bottom wall of the outer box comprises
   an outer bottom panel joined to the outer side panel by a fold line; and
   an inner bottom panel joined to the inner side panel by a fold line;
   wherein the insulation cavity is a first insulation cavity; and
   wherein the outer bottom panel and the inner bottom panel define a second insulation cavity therebetween.

4. The box assembly of claim 1, wherein:
   the side wall of the inner box comprises
   an outer side panel;
   a connecting strip joined to the outer side panel by a fold line; and
   an inner side panel joined to the connecting strip by a fold line; and
   wherein the outer side panel, the connecting strip, and the inner side panel define the insulation cavity therebetween.

5. The box assembly of claim 4, wherein:
   the wall of the inner box forming a portion of a top side of the box assembly wall is a bottom wall during assembly of the inner box, the bottom wall of the inner box comprising
   an outer bottom panel joined to the outer side panel by a fold line; and
   an inner bottom panel joined to the inner side panel by a fold line;
   wherein the insulation cavity is a first insulation cavity; and
   wherein the outer bottom panel and the inner bottom panel define a second insulation cavity therebetween.

6. The box assembly of claim 1, wherein the insulation cavity of the bottom wall of the outer box is filled with a repulpable insulator pad.

7. The box assembly of claim 1, wherein the insulation cavity of the side wall of the outer box is filled with a repulpable insulator pad.

8. The box assembly of claim 1, wherein the outer box comprises four side walls, each side wall comprising
   an outer side panel;
   a connecting strip joined to the outer side panel by a fold line; and
   an inner side panel joined to the connecting strip by a fold line; and
   wherein the outer side panels, the connecting strips, and the inner sides panel define the insulation cavities therebetween.

9. The box assembly of claim 8, wherein the outer box comprises a side tab joined by a fold line to at least one of the inner side panels, the side tab covered by an inner side panel of an adjacent side wall such that the side tab is inside one of the insulation cavities.

10. The box assembly of claim 1, wherein the handle comprises adhesive ends, the adhesive ends configured to secure a plurality of outer bottom panels of the inner box to form the wall of the inner box forming the portion of the top side of the box assembly.

11. The box assembly of claim 1, further comprising an access tab attached to the outer box and covering a corner of the inner box, such that the inner box is secured inside the outer box.

12. The box assembly of claim 11, wherein the access tab defines a cut and a perforation such that tearing the perforation opens up the cut and exposes the corner of the inner box, allowing the inner box to telescope out of the outer box.

13. A method of assembling a telescoping insulated box assembly, comprising:
   assembling an outer box by folding an inner side panel into the outer box, the inner side panel joined to a connecting strip by a fold line, the connecting strip joined to an outer side panel by a fold line, the outer side panel, the connecting strip, and the inner side panel forming a side wall and defining an insulation cavity therebetween;
   assembling an inner box by folding an inner side panel of the inner box into the inner box, the inner side panel joined to a connecting strip by a fold line, the connecting strip joined to an outer side panel by a fold line, the outer side panel, the connecting strip, and the inner side panel forming a side wall and defining an insulation cavity of the inner box therebetween;
   inserting the inner box into the outer box, such that an open top of the inner box is proximate a bottom of the outer box, and a bottom of the inner box forms a portion of a top side of the box assembly; and attaching a handle to the inner box, the handle configured to allow the inner box to be pulled out of the outer box.

14. The method of claim 13, wherein the insulation cavity of the outer box is a first insulation cavity of the outer box, and wherein the method further comprises:
folding at least two outer bottom panels of the outer box;
folding at least two inner bottom panels of the outer box;
forming a second insulation cavity between the inner bottom panels and the outer bottom panels;
and placing a plurality of insulator pads in the first and second insulation cavities.

15. The method of claim 13, further comprising
folding a side tab, the side tab joined by a fold line to one of the inner side panels, behind an inner side panel of an adjacent side wall, such that the inner side panel joined to the side tab is restricted from folding up.

16. The method of claim 13, further comprising placing a repulpable insulator pad in the insulation cavity of at least one of the outer box or the inner box.

17. The method of claim 13, wherein the outer box comprises four inner side panels, four connecting strips, and four outer side panels, the side panels, the connecting strips, and the outer side panels defining four side walls, and wherein four portions of the insulation cavity are defined within the four side walls.

18. The method of claim 17, further comprising wrapping a single insulator pad around the four inner side panels inside the insulation cavity.

* * * * *